US010479362B2

United States Patent
Goto et al.

(10) Patent No.: US 10,479,362 B2
(45) Date of Patent: Nov. 19, 2019

(54) AUTONOMOUS DRIVING ASSISTANCE SYSTEM, AUTONOMOUS DRIVING ASSISTANCE METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Hirohiko Goto, Chiryu (JP); Yuji Sato, Owariasahi (JP); Kuniaki Tanaka, Nagoya (JP); Masaki Takano, Susono (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 15/556,483

(22) PCT Filed: Mar. 30, 2016

(86) PCT No.: PCT/JP2016/060542
§ 371 (c)(1),
(2) Date: Sep. 7, 2017

(87) PCT Pub. No.: WO2016/159170
PCT Pub. Date: Oct. 6, 2016

(65) Prior Publication Data
US 2018/0099676 A1    Apr. 12, 2018

(30) Foreign Application Priority Data
Mar. 31, 2015    (JP) .................................. 2015-074403

(51) Int. Cl.
*B60W 30/18*    (2012.01)
*B60W 30/12*    (2006.01)
(Continued)

(52) U.S. Cl.
CPC ...... *B60W 30/18163* (2013.01); *B60W 10/04* (2013.01); *B60W 10/18* (2013.01);
(Continued)

(58) Field of Classification Search
CPC .............................. B60W 30/18; G01C 21/34
See application file for complete search history.

(56) References Cited

U.S. PATENT DOCUMENTS

| 8,666,646 B2 * | 3/2014 | Zaitsu | G08G 1/167 |
| | | | 340/995.19 |
| 2005/0256630 A1 * | 11/2005 | Nishira | B60K 31/0008 |
| | | | 701/96 |

(Continued)

FOREIGN PATENT DOCUMENTS

| JP | 2003-157500 A | 5/2003 |
| JP | 2009-109340 A | 5/2009 |

(Continued)

OTHER PUBLICATIONS

Jun. 7, 2016 International Search Report issued in Patent Application No. PCT/JP2016/060542.

*Primary Examiner* — Kira Nguyen
(74) *Attorney, Agent, or Firm* — Oliff PLC

(57) ABSTRACT

Autonomous driving assistance systems, methods, and programs obtain lane information of a road on which a vehicle is traveling, and set a planned target section for which a lane change plan of the vehicle is to be created. The systems, methods, and programs obtain, for each lane, an obstructive factor present on the road on which the vehicle is traveling and that obstructs continuation of autonomous driving assistance executed on the vehicle, and set, for each obtained obstructive factor, an avoidance route that passes through a lane avoiding the obstructive factor. The systems, methods, and programs create a lane change route that defines the lane change plan of the vehicle in the planned target section and
(Continued)

that is set so as to preferentially pass through the avoidance route set for each obtained obstructive factor, and execute the autonomous driving assistance of the vehicle based on the lane change route.

11 Claims, 17 Drawing Sheets

(51) Int. Cl.
| | | |
|---|---|---|
| G01C 21/34 | (2006.01) | |
| B60W 30/10 | (2006.01) | |
| G05D 1/00 | (2006.01) | |
| G05D 1/02 | (2006.01) | |
| B62D 15/02 | (2006.01) | |
| G08G 1/16 | (2006.01) | |
| B60W 10/04 | (2006.01) | |
| B60W 10/18 | (2012.01) | |
| B60W 10/20 | (2006.01) | |
| B60W 30/09 | (2012.01) | |
| G01C 21/36 | (2006.01) | |

(52) U.S. Cl.
CPC ............ *B60W 10/20* (2013.01); *B60W 30/09* (2013.01); *B60W 30/10* (2013.01); *B60W 30/12* (2013.01); *B62D 15/0255* (2013.01); *G01C 21/3492* (2013.01); *G05D 1/0088* (2013.01); *G05D 1/0212* (2013.01); *G08G 1/167* (2013.01); *B60W 2550/10* (2013.01); *G01C 21/3658* (2013.01); *G01C 21/3691* (2013.01); *G05D 2201/0213* (2013.01)

(56) References Cited

U.S. PATENT DOCUMENTS

| | | | | |
|---|---|---|---|---|
| 2007/0124072 | A1* | 5/2007 | Nakayama | G01C 21/3658 701/431 |
| 2009/0138193 | A1* | 5/2009 | Katou | G01C 21/3655 701/533 |
| 2013/0184926 | A1* | 7/2013 | Spero | B62D 1/28 701/26 |
| 2013/0211656 | A1* | 8/2013 | An | G05D 1/0221 701/25 |
| 2014/0046503 | A1* | 2/2014 | Mulder | B60W 30/12 701/1 |

FOREIGN PATENT DOCUMENTS

| | | |
|---|---|---|
| JP | 2011-123840 A | 6/2011 |
| JP | 2011-162132 A | 8/2011 |
| JP | 2012-051441 A | 3/2012 |

* cited by examiner

FIG. 2

LEVEL-OF-INFLUENCE TABLE 32

| | OBSTRUCTIVE FACTOR | LEVEL OF INFLUENCE |
|---|---|---|
| FIRST FACTOR | LANE REDUCTION (USER'S LANE) | ∞ |
| | MERGING LANE ENDS (USER'S LANE) | ∞ |
| SECOND FACTOR | LANE REDUCTION (LANE NEXT TO USER'S LANE) | 0.2 |
| | MERGING LANE IS NEXT TO USER'S LANE | 0.2 |
| THIRD FACTOR | FADED LANE MARKING (ONE SIDE) | 0.1 × DISTANCE (IN MULTIPLES OF 100 M) |
| | FADED LANE MARKING (BOTH SIDES) | 0.5 × DISTANCE (IN MULTIPLES OF 100 M) |
| OTHERS | NEW LANE IS ADDED NEXT TO USER'S LANE | 0.1 |

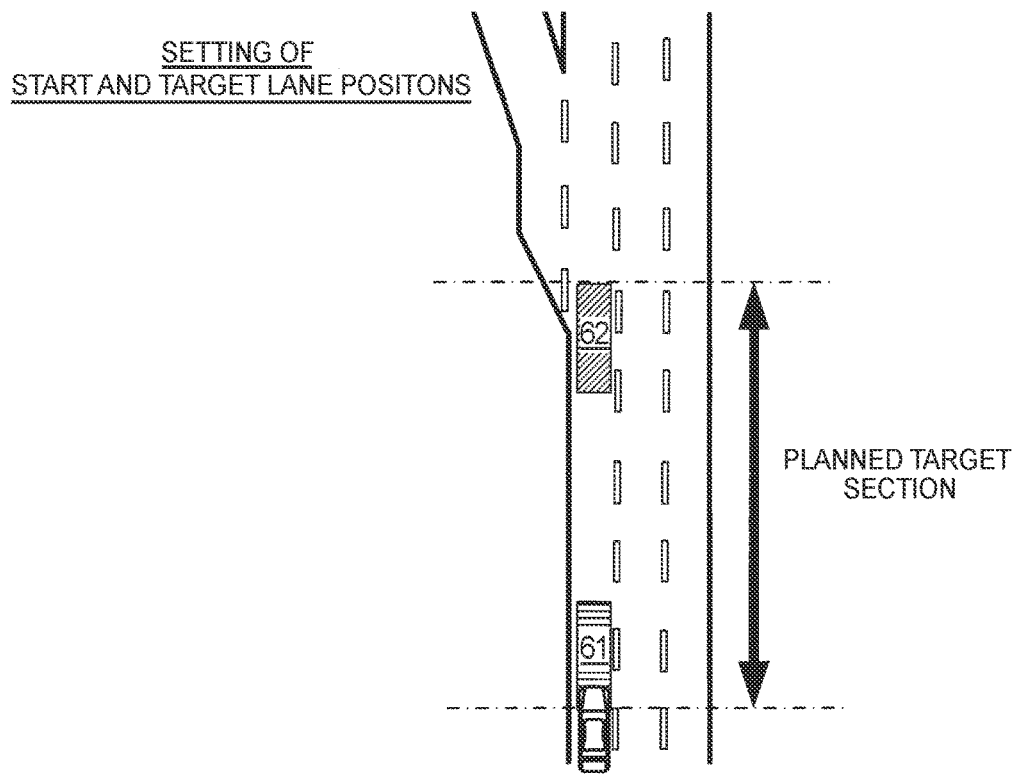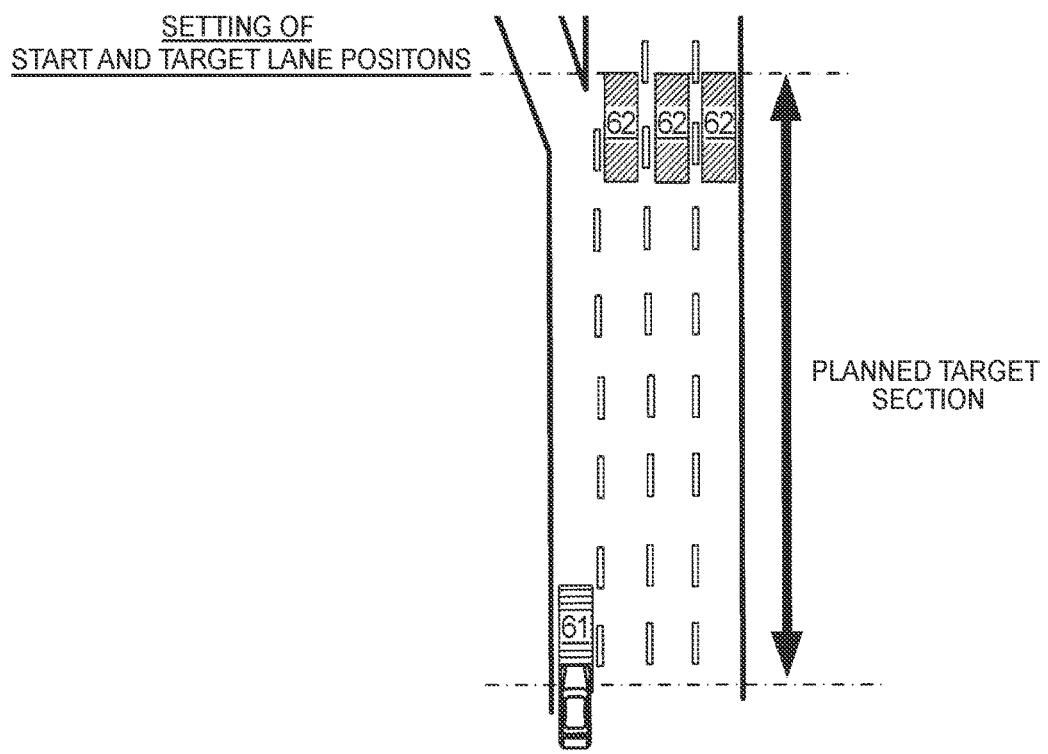

AUTONOMOUS DRIVING ASSISTANCE SYSTEM, AUTONOMOUS DRIVING ASSISTANCE METHOD, AND COMPUTER PROGRAM

TECHNICAL FIELD

Related technical fields include autonomous driving assistance systems, methods, and computer programs which assist autonomous driving of vehicles.

BACKGROUND

In recent years, in addition to manual driving in which a vehicle travels based on user's driving maneuvers, a new drive mode has been proposed regarding autonomous driving assistance systems that assist the user in driving a vehicle by performing a part or all of user's driving maneuvers by the vehicle. For example, the autonomous driving assistance system autonomously performs vehicle control such as control of steering, a driving source, and a brake so as to keep the vehicle approximately centered in the lane while maintaining a preset vehicle speed and a certain distance to a vehicle ahead. The autonomous driving assistance system is advantageous in that it eases the driving burden on the user. However, depending on the surrounding environment and the road conditions, situations (obstructive factors that obstruct continuation of autonomous driving assistance) may arise in which it is difficult to continue autonomous driving assistance. Examples of such situations include the situation where it is necessary to perform complicated vehicle maneuvers when the user merges into another lane or when another vehicle merges into the user's lane, and the situation where lane markings cannot be detected. If such obstructive factors occur, there is a possibility that autonomous driving assistance may be cancelled.

As a solution to this problem, a technique is conventionally proposed in which autonomous driving assistance is continuously performed by avoiding such obstructive factors that obstruct continuation of autonomous driving assistance. For example, Japanese Patent Application Publication No. 2012-51441 (JP 2012-51441 A) proposes a technique in which, if a sensor detects an obstacle (e.g., a parked vehicle) ahead on the driver's lane, a new route is created to avoid the obstacle, and the vehicle is moved along the route thus created, so that autonomous driving assistance is continued without being cancelled.

SUMMARY

In the technique of JP 2012-51441 A, a route avoiding the obstructive factor located closest to the vehicle can be created, but a route taking into consideration a plurality of obstructive factors that are present on a route after this obstructive factor cannot be created. That is, in the technique of JP 2012-51441 A, every time an obstructive factor appears in front of the vehicle, a new route avoiding only this obstructive factor is created. Accordingly, there is a risk that a route may be selected in which autonomous driving assistance is likely to be cancelled because many lane changes are required, there is an unavoidable obstructive factor, etc. when looking at the entire route.

Exemplary embodiments of the broad inventive principles described herein provide an autonomous driving assistance system, an autonomous driving assistance method, and a computer program, which can create an optimal lane change route so as to avoid any obstructive factor that obstructs continuation of autonomous driving assistance and which reduces the number of lane changes and allows autonomous driving assistance to be continuously performed without being cancelled.

Exemplary embodiments provide autonomous driving assistance systems, methods, and programs that obtain lane information of a road on which a vehicle is traveling, and set a planned target section for which a lane change plan of the vehicle is to be created. The systems, methods, and programs obtain, for each lane, an obstructive factor present on the road on which the vehicle is traveling and that obstructs continuation of autonomous driving assistance executed on the vehicle, and set, for each obtained obstructive factor, an avoidance route that passes through a lane avoiding the obstructive factor. The systems, methods, and programs create a lane change route that defines the lane change plan of the vehicle in the planned target section and that is set so as to preferentially pass through the avoidance route set for each obtained obstructive factor, and execute the autonomous driving assistance of the vehicle based on the lane change route.

The term "autonomous driving assistance" refers to the function to perform at least a part of driver's vehicle maneuvers on behalf of the driver or to assist the driver with at least a part of his/her vehicle maneuvers.

According to the autonomous driving assistance system, the autonomous driving assistance method, and the computer program which have the above configuration, regarding the obstructive factors that obstruct continuation of the autonomous driving assistance, not only the closest obstructive factor but also a plurality of obstructive factors that are present on the road on which the vehicle is traveling are taken into account, whereby an optimal lane change route that avoids the obstructive factors in the entire route can be created. As a result, the number of lane changes is reduced, and the autonomous driving assistance can be continuously performed without being cancelled.

BRIEF DESCRIPTION OF THE DRAWINGS

FIG. 2 is a diagram showing an example of a level-of-influence table.

FIG. 10 is a diagram illustrating a method for setting a start lane position and a target lane position.

FIG. 11 is a diagram illustrating a method for setting a start lane position and a target lane position.

DETAILED DESCRIPTION OF EXEMPLARY EMBODIMENTS

Figure 1:
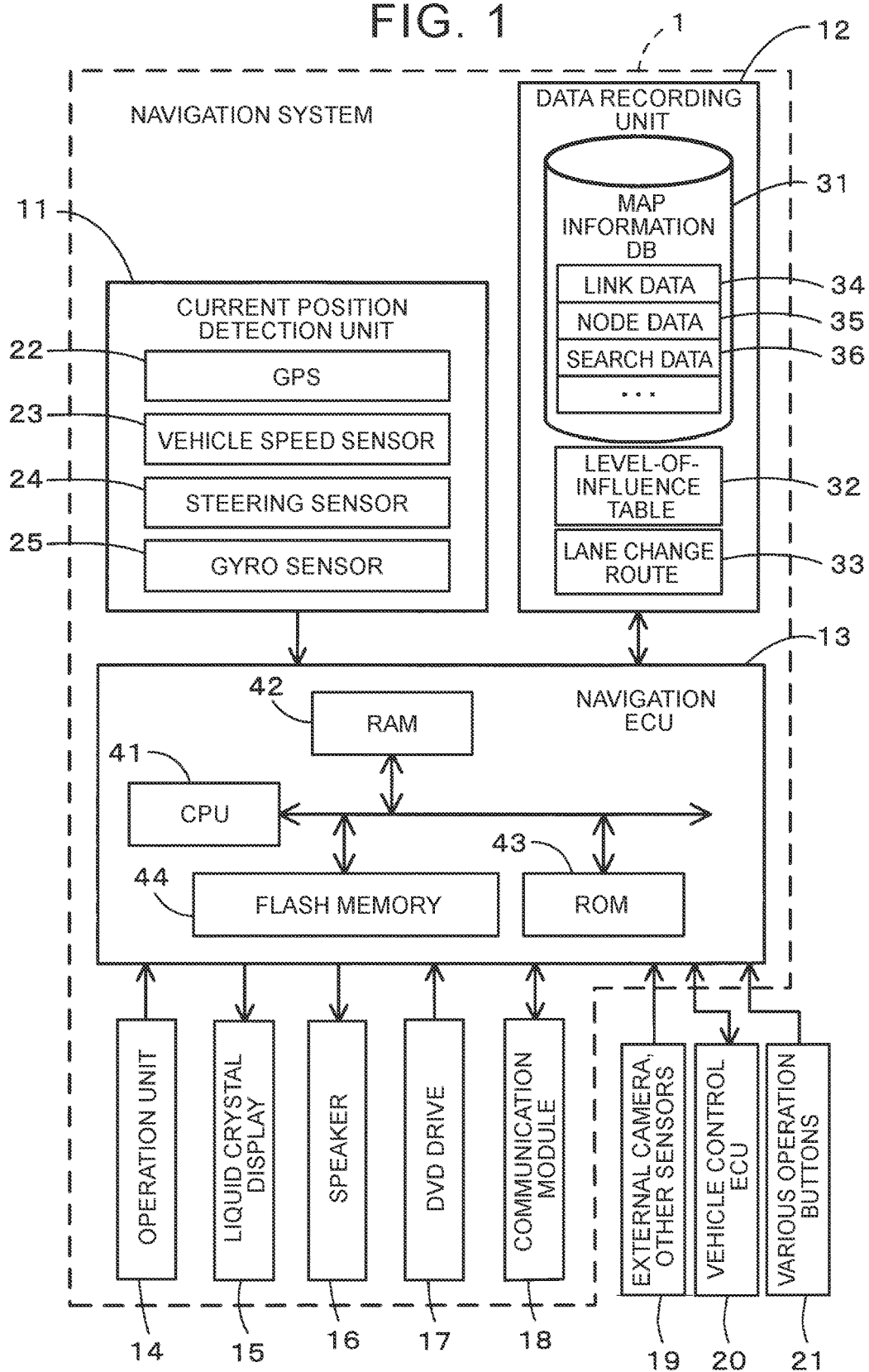
FIG. 1 is a block diagram showing the configuration of a navigation system according to an embodiment.

An autonomous driving assistance system will be described in detail below based on an embodiment of a navigation system with reference to the accompanying drawings. First, the general configuration of a navigation system 1 according to an embodiment will be described with reference to FIG. 1. FIG. 1 is a block diagram of the navigation system 1 according to the embodiment.

As shown in FIG. 1, the navigation system 1 according to the embodiment is comprised of: a current position detection unit 11 that detects the current position of a vehicle equipped with the navigation system 1; a data recording unit 12 having various data recorded thereon; a navigation ECU 13 that performs various arithmetic operations based on received information; an operation unit 14 that accepts user's operation; a liquid crystal display 15 that displays to the user a map around the vehicle, information on a guidance route (planned route of the vehicle) set by the navigation system 1, etc.; a speaker 16 that outputs voice guidance of the route guidance; a DVD drive 17 that reads a DVD serving as a storage medium; and a communication module 18 that communicates with an information center such as a probe center or a Vehicle Information and Communication System (VICS (registered trademark)) center. (As used herein, the term "storage medium" is not intended to encompass transitory signals.) The navigation system 1 is connected via an in-vehicle network such as a CAN to an external camera 19 and various sensors which are mounted on the vehicle equipped with the navigation system 1. The navigation system 1 is also connected to a vehicle control ECU 20 that performs various controls of the vehicle equipped with the navigation system 1, in such a manner that the navigation system 1 and the vehicle control ECU 20 can communicate with each other in two ways. The navigation system 1 is also connected to various operation buttons 21 mounted on the vehicle, such as an autonomous driving start button.

Components of the navigation system 1 will be sequentially described below.

The current position detection unit 11 is comprised of a GPS 22, a vehicle speed sensor 23, a steering sensor 24, a gyro sensor 25, etc. and can detect the current position and orientation of the vehicle, the traveling speed of the vehicle, the current time, etc. In particular, the vehicle speed sensor 23 is a sensor that detects the distance traveled by the vehicle and the vehicle speed. The vehicle speed sensor 23 generates pulses according to rotation of drive wheels of the vehicle and outputs pulse signals to the navigation ECU 13. The navigation ECU 13 counts the number of generated pulses to calculate the rotational speed of the drive wheels and the traveled distance. The navigation system 1 need not necessarily include all of these four sensors. The navigation system 1 may include only one or more of these sensors.

The data recording unit 12 includes a hard disk (not shown) serving as an external storage device and a recording medium, and a recording head (not shown) serving as a driver for reading a map information DB 31, a level-of-influence table 32, a lane change route 33, a predetermined program, etc. recorded on the hard disk and writing predetermined data on the hard disk. The data recording unit 12 may be comprised of a flash memory, a memory card, or an optical disk such as a CD or a DVD instead of the hard disk. The map information DB 31, the level-of-influence table 32, and the lane change route 33 may be stored in an external server, and the navigation system 1 may communicate with the external server to obtain the map information DB 31, the level-of-influence table 32, and the lane change route 33.

The map information DB 31 is storage means having stored therein, e.g., link data 34 regarding roads (links), node data 35 regarding node points, search data 36 that is used for processing associated with a route search and a route change, facility data regarding facilities, map display data for displaying a map, intersection data regarding intersections, search data for searching for locations, etc.

The link data 34 includes: regarding links of roads, data indicating the width, gradient, cant, and bank of the road to which the link belongs, the road surface condition, a merging section, the road structure, the number of lanes on the road, a location where the number of lanes decreases, a location where the road narrows, a railroad crossing, etc.; regarding corners, data indicating the radius of curvature, an intersection, a T-junction, the entrance and exit of the corner, etc.; regarding road attributes, data indicating a downhill road, an uphill road, etc.; and regarding road types, data indicating a local road such as a national road, a prefectural road, or a narrow street, and a toll road such as a national expressway, an urban expressway, an automobile road, a local toll road, or a toll bridge. In particular, in the present embodiment, information that specifies road connection for each lane (specifically, which lane connects to which road when the road branches off) is also stored in addition to classification of lanes of the road.

The node data 35 includes data regarding the coordinates (positions) of node points that are set at branch points (including an intersection, a T-junction, etc.) of actual roads and that are set at predetermined intervals on each road according to the radius of curvature etc., node attributes indicating whether the node is a node corresponding to an intersection or not etc., a connection link number list that is a list of link numbers of links connecting to the node, an adjacent node number list that is a list of node numbers of nodes located adjacent to the node with a link therebetween, the height (altitude) of each node point, etc.

The search data 36 includes various data to be used for route search processing of searching for a route from a departure point (e.g., the current position of the vehicle) to a set destination. Specifically, cost calculation data to be used to calculate search cost such as cost showing a quantified level of appropriateness of a route regarding an intersection (hereinafter referred to as intersection cost) and cost showing a quantified level of appropriateness of a route regarding each link of a road (hereinafter referred to as link cost) is stored as the search data 36.

The level-of-influence table 32 is a table defining the degree to which each type of obstructive factor that obstructs continuation of autonomous driving assistance for the vehicle affects continuation of autonomous driving assistance. FIG. 2 is a diagram showing an example of the level-of-influence table 32.

Drive modes of the vehicle include driving with autonomous driving assistance in which the vehicle autonomously travels along a preset route or along the road without user's driving maneuvers, in addition to manual driving in which the vehicle travels based on user's driving maneuvers. For example, in driving with autonomous driving assistance, the current position of the vehicle, the current lane of the vehicle, and the position of other traffic around the vehicle are detected as needed, and the vehicle control ECU 20 autonomously performs vehicle control such as control of steering, a driving source, and a brake so that the vehicle travels along a preset route or along the road. In particular, in the case where the lane change route 33 described below has been created, the vehicle is controlled to travel along the lane change route 33. In driving with autonomous driving assistance of the present embodiment, the vehicle is not controlled to make lane changes and right and left turns, and the vehicle basically travels in the same lane unless the user performs vehicle maneuvers to change lanes or to turn right or left.

The following five types of autonomous driving assistance are executed in the present embodiment.

(1) "Constant speed cruising" . . . The vehicle is controlled to travel in the same lane at a predetermined set speed (e.g., 90% of the speed limit of a road on which the vehicle is traveling)

(2) "Adaptive cruising" . . . The vehicle is controlled to travel in the same lane at up to a set speed (e.g., 90% of the speed limit of a road on which the vehicle is traveling) while maintaining a certain distance (e.g., 10 m) to the vehicle ahead.

(3) "Speed management (curve)" . . . When there is a curve ahead in the direction in which the vehicle is traveling, the vehicle is decelerated to a speed according to the radius of curvature of the curve by the time the vehicle enters the curve.

(4) "Speed management (exit road)" . . . Acceleration of the vehicle is restrained when the vehicle travels in a deceleration lane (exit road) of an expressway etc.

(5) "Speed management (tollgate, stop sign, signal)" . . . When there is a tollgate, a stop sign, or a signal ahead in the direction in which the vehicle is traveling, the vehicle is decelerated to a speed (e.g., 20 km/h) at which the vehicle can be stopped without placing a burden on an occupant of the vehicle by the time the vehicle reaches the tollgate, the stop sign (road sign), or the signal.

The following control is also performed in parallel with the controls (1) to (5).

(6) Control to keep the vehicle approximately centered in the lane (e.g., lane keeping assistance) without causing lane deviation.

The controls (1) to (6) for autonomous driving assistance may be performed either in all road sections or only when the vehicle is traveling on a freeway having gates (either manned or unmanned, and either toll or toll-free) at boundaries with other roads connecting to the freeway. Autonomous driving assistance is not necessarily executed when the vehicle travels in a section where the vehicle can travel autonomously (hereinafter referred to as an autonomous driving section), but is executed only in situations where autonomous driving assistance is selected by the user and it is determined that the vehicle can travel with autonomous driving assistance. An example of situations where the vehicle cannot travel with autonomous driving assistance is a situation where road information required to execute autonomous driving assistance, such as lane markings, cannot be obtained.

There are cases where autonomous driving assistance is stopped if it is detected that the user has performed a specific vehicle maneuver (hereinafter referred to as an override) of an accelerator, a brake, steering, etc. while the vehicle is traveling with autonomous driving assistance. For example, the controls (1) to (5) are stopped if it is detected that the user has operated a brake. If it is detected that the user has performed a steering operation, the controls (1) to (5) are basically continued, but the control (6) is temporarily stopped until the operation is terminated.

The level-of-influence table 32 shown in FIG. 2 is a table defining the degree to which each type of obstructive factor that obstructs continuation of autonomous driving assistance executed on the vehicle as described above affects continuation of autonomous driving assistance. That is, a factor that is more likely to cause autonomous driving assistance to be stopped has a higher level of influence.

The factors that obstruct continuation of autonomous driving assistance are roughly divided into three types.

"First factors" . . . The vehicle can no longer continue to travel on the same lane and therefore can no longer travel with autonomous driving assistance (and with manual driving).

"Second factors" . . . Since another vehicle traveling in the adjacent lane needs to merge into the lane in which the vehicle is traveling, various vehicle maneuvers of a brake and an accelerator are required, and autonomous driving assistance may be cancelled due to such overrides.

"Third factors" . . . Since road information required to execute autonomous driving assistance on the vehicle cannot be obtained, autonomous driving assistance may be cancelled.

Figure 3:
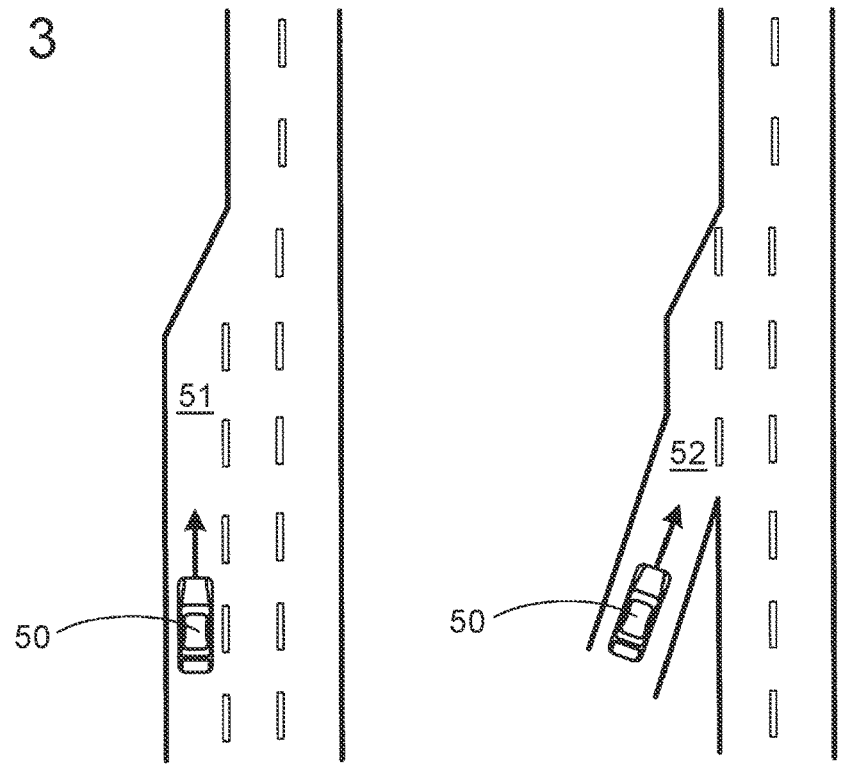
FIG. 3 is a diagram showing particularly an example of a first factor of obstructive factors.

The first factors include the case where a lane 51 in which a vehicle 50 is traveling ends due to lane reduction and the case where the vehicle 50 is traveling particularly in a merging lane 52 and the merging lane 52 ends, as shown in FIG. 3. In such cases, the vehicle 50 traveling in the lane 51 or the merging lane 52 must change lanes to move to another lane, and autonomous deriving assistance will definitely not be able to be continued on the lane 51 and the merging lane 52. Accordingly, the level of influence of the first factors is "infinite."

Figure 4:
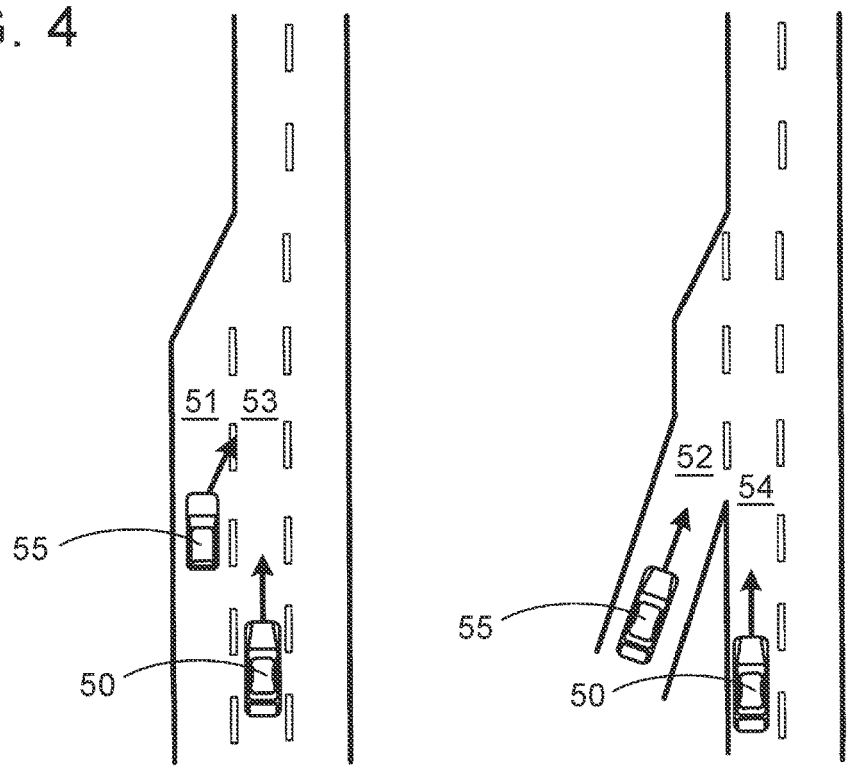
FIG. 4 is a diagram showing particularly an example of a second factor of the obstructive factors.

The second factors include the case where the lane 51 next to a lane 53 in which the vehicle 50 is traveling ends due to lane reduction and the case where the vehicle 50 is traveling particularly in a lane 54 next to the merging lane 52 (regardless of whether the merging lane ends or not), as shown in FIG. 4. In such cases, if another vehicle 55 traveling in the lane 51 or the merging lane 52 merges into the lane 53, 54 in which the vehicle 50 is traveling, the vehicle 50 requires various vehicle maneuvers of a brake and an accelerator for merging, and autonomous driving assistance may be cancelled in response to detection of such overrides. When there is no other vehicle 55 or when there is a sufficient distance to the vehicle 55, autonomous driving assistance is not cancelled. The level of influence is therefore "0.2," which is lower than the first factors.

Figure 5:
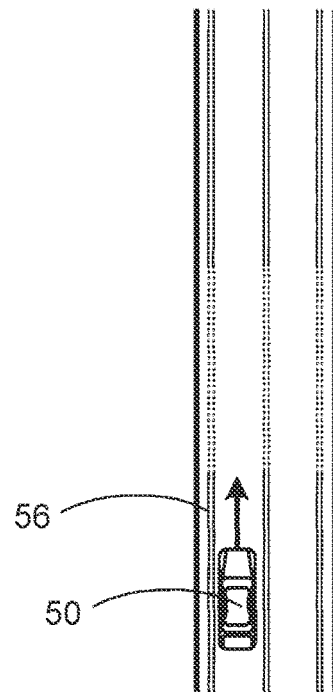
FIG. 5 is a diagram showing particularly an example of a third factor of the obstructive factors.

The third factors include the case where lane markings 56 are missing or have faded so much that a camera cannot recognize them, as shown in FIG. 5. In such a case, since the vehicle 50 cannot specify the lane in which the vehicle 50 is traveling, autonomous driving assistance may be cancelled. If only one lane marking is missing or has faded so much that the camera cannot recognize it, autonomous driving assistance may be able to be continued based on the other lane marking. The level of influence is therefore as low as "0.1×the distance (in multiples of 100 m) over which the lane marking cannot be recognized." If both lane markings are missing or have faded so much that the camera cannot recognize them, autonomous driving assistance is more likely to be cancelled. The level of influence is therefore "0.5×the distance (in multiples of 100 m) over which the lane markings cannot be recognized." In the present embodiment, lane markings are particularly described as road information required to execute autonomous driving assistance for the "third factors," other information may be used as this road information. For example, the obstructive factor may be the case where the radius of curvature of a curve cannot be obtained.

Figure 6:
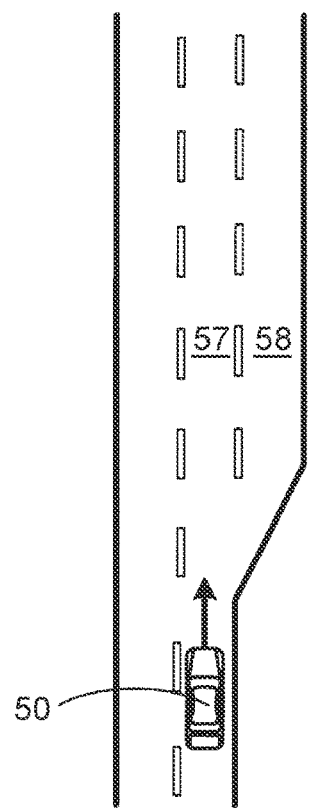
FIG. 6 is a diagram showing an example of a factor other than the first to third factors out of the obstructive factors.

Obstructive factors other than the "first to third factors" include the case where a new lane 58 is added next to a lane 57 in which the vehicle 50 is traveling due to lane increase, as shown in FIG. 6. In such a case, since a lane marking of the lane 57 is divided or is interrupted in a certain area, the vehicle 50 may not be able to correctly recognize the lane 57 in which the vehicle 50 is traveling, and the vehicle 50 may deviate toward the lane 58 or may move unsteadily from side to side, whereby autonomous driving assistance may be cancelled. However, since there is a case where the vehicle 50 can correctly recognize the lane 57 and also control to reduce such unsteady movement is performed, the level of influence is "0.1," which is smaller than the first and second factors.

The navigation ECU 13 creates the lane change route 33 based on the level-of-influence table 32, as described below. The lane change route 33 is a route showing how a vehicle is supposed to make lane changes when the vehicle is going to travel on a road having a plurality of lanes during execution of autonomous driving assistance.

Specifically, a route including no obstructive factor, and a route that, even if it includes obstructive factors, has a smaller sum of the levels of influence set for the obstructive factors, are preferentially created as the lane change route 33. A route in which autonomous driving assistance is less likely to be cancelled can thus be created as the lane change route 33.

Figure 7:
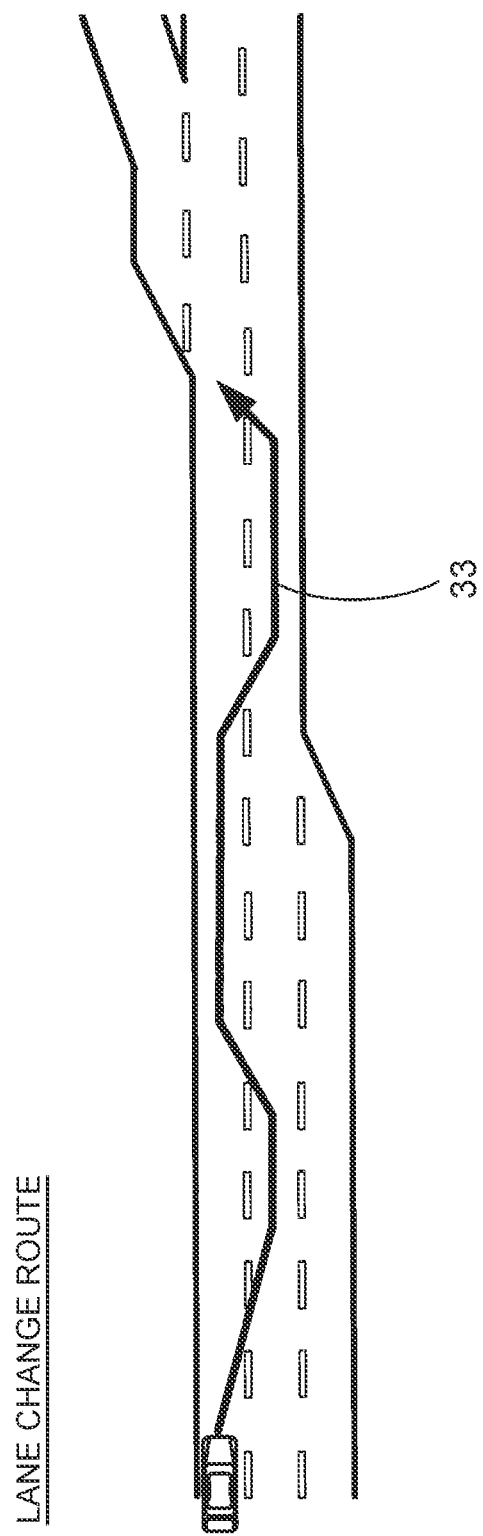
FIG. 7 is a diagram showing an example of a lane change route.

For example, FIG. 7 is a diagram showing an example of the created lane change route 33. As shown in FIG. 7, a "section where the vehicle is supposed to make a lane change" and a "section where the vehicle is supposed to travel along the road in the same lane" are set in the lane change route 33. For the "section where the vehicle is supposed to make a lane change," it is defined from which lane to which lane the vehicle is supposed to move. For the "section where the vehicle is supposed to travel along the road," it is defined in which of the plurality of lanes the vehicle is supposed to travel. As described above, in the present embodiment, a route is created with reference to the level-of-influence table 32 so that the vehicle makes lane changes so as to avoid as much as possible the obstructive factors that obstruct continuation of autonomous driving assistance. A method for creating the lane change route 33 will be described in detail later. In the case where autonomous driving assistance is executed on the vehicle as described below, the autonomous driving assistance is executed so that the vehicle travels along the created lane change route 33. In autonomous driving assistance of the present embodiment, lane changes cannot be made autonomously as described above, and therefore the user is prompted to make a lane change when it is time to change lanes in the lane change route 33.

The navigation electronic control unit (ECU) 13 is an electronic control unit that generally controls the navigation system 1. The navigation ECU 13 includes: a CPU 41 serving as an arithmetic unit and a control unit; and internal storage devices such as a RAM 42 that is used as a working memory when the CPU 41 performs various arithmetic operations and that stores route data etc. when a route search is conducted, a ROM 43 having recorded thereon an autonomous driving assistance program (see FIG. 8) described below etc. in addition to a control program, and a flash memory 44 that stores a program read from the ROM 43. The navigation ECU 13 forms various means serving as processing algorithms. For example, lane information obtaining means obtains lane information of a road on which the vehicle is traveling. Obstructive factor obtaining means obtains, for each lane, any obstructive factor that is present on a road on which the vehicle is traveling and that obstructs continuation of autonomous driving assistance executed on the vehicle. Avoidance route setting means sets, for each obstructive factor obtained by the obstructive factor obtaining means, an avoidance route that passes through lanes so as to avoid the obstructive factor. Lane change route creating means creates a lane change route that defines a lane change plan of the vehicle and that is set so that the vehicle preferentially travels the avoidance routes set for each obstructive factor obtained by the obstructive factor obtaining means. Autonomous driving assist means executes autonomous driving assistance of the vehicle based on the lane change route.

The operation unit 14 is operated to enter a departure point as a start point and a destination as an end point etc. and is formed by a plurality of operation switches (not shown) such as various keys and buttons. The navigation ECU 13 performs control based on switch signals output in response to depression etc. of the switches so as to execute various associated operations. The operation unit 14 may be formed by a touch panel that is provided on the front surface of the liquid crystal display 15. Alternatively, the operation unit 14 may be formed by a microphone and a speech recognition device.

A map image including roads, traffic information, operation guidance, an operation menu, key guidance, guidance information on a guidance route (planned route) or the lane change route 33, news, a weather forecast, time, emails, TV programs, etc. are displayed on the liquid crystal display 15. In particular, during execution of autonomous driving assistance, a prompt to make a lane change is displayed when it is time to change lanes in the lane change route 33. An HUD or an HMD may be used instead of the liquid crystal display 15.

The speaker 16 outputs voice guidance that provides travel guidance along the guidance route or the lane change route 33 and guidance of traffic information, based on a command from the navigation ECU 13. In particular, during execution of autonomous driving assistance, the speaker 16 outputs voice guidance prompting the user to make a lane change when it is time to change lanes in the lane change route 33.

The DVD drive 17 is a drive that can read data recorded on a recording medium such as a DVD or a CD. The DVD drive 17 plays music or videos, updates the map information DB 31, etc. based on the read data. A card slot for reading and writing a memory card may be provided instead of the DVD drive 17.

The communication module 18 is a communication device that receives traffic information, probe information, weather information, etc. transmitted from a traffic information center such as, e.g., a VICS center or a probe center. For example, the communication module 18 is a mobile phone or a DCM. Other examples of the communication module 18 include a vehicle-to-vehicle communication device for communication between vehicles, and a roadside-to-vehicle communication device for communication between a vehicle and a roadside unit.

The external camera 19 is, e.g., a camera using a solid state imaging element such as a CCD. The external camera 19 is attached to the vehicle at a position above a front bumper and is mounted such that its optical axis is tilted downward at a predetermined angle with respect to the horizontal direction. The external camera 19 captures an image of the road ahead of the vehicle in the direction in which the vehicle travels, when the vehicle travels in an autonomous driving section. The vehicle control ECU 20 processes the captured image to detect pavement markings applied to the road on which the vehicle is traveling, other traffic around the vehicle, etc. and performs autonomous driving assistance of the vehicle based on the detection result. The external camera 19 may be placed on the rear or side part of the vehicle instead of on the front part of the vehicle. Instead of the camera, a sensor such as a millimeter wave radar, vehicle-to-vehicle communication, or roadside-to-vehicle communication may be used as means for detecting other traffic. An illuminance sensor or a rain sensor may be mounted as means for detecting other surrounding environments.

The vehicle control ECU 20 is an electronic control unit that controls the vehicle equipped with the navigation system 1. The vehicle control ECU 20 is connected to each driving part of the vehicle such as steering, a brake, and an accelerator. In the present embodiment, the vehicle control ECU 20 executes autonomous driving assistance of the vehicle by controlling each driving part particularly after autonomous driving assistance is started in the vehicle. When the user performs an override during autonomous driving assistance, the vehicle control ECU 20 detects the override.

The navigation ECU 13 sends command signals regarding autonomous driving assistance to the vehicle control ECU 20 via a CAN after the vehicle starts to travel. The vehicle control ECU 20 executes autonomous driving assistance after the vehicle starts to travel, in response to the received command signals. The command signals contain information about the content of control of autonomous driving assistance (e.g., any of the controls (1) to (6)) to be executed on the vehicle and information instructing to start, stop, or change the control etc. Instead of the navigation ECU 13, the vehicle control ECU 20 may set the content of control of autonomous driving assistance. In that case, the vehicle control ECU 20 is configured to obtain information required to set the content of control of autonomous driving assistance, such as a planned route (guidance route), the condition of the vehicle, and map information of surrounding areas, from the navigation system 1.

Figure 8:
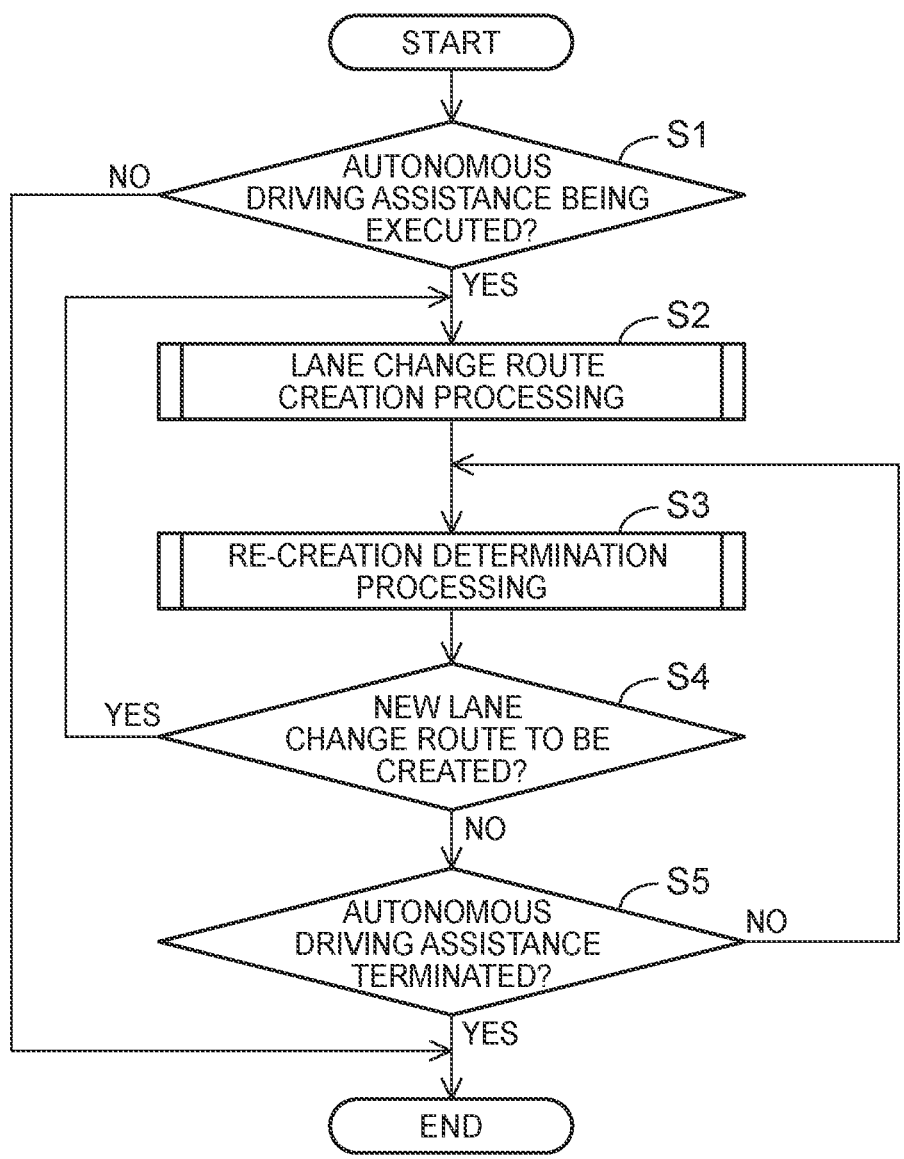
FIG. 8 is a flowchart of an autonomous driving assistance program according to an embodiment.

The autonomous driving assistance program that is executed by the CPU 41 in the navigation system 1 of the present embodiment having the above configuration will be described below based on FIG. 8. FIG. 8 is a flowchart of the autonomous driving assistance program according to the present embodiment. The autonomous driving assistance program is a program that is executed after an ACC power of the vehicle is turned on, that creates the lane change route 33 defining a lane change plan of the vehicle in the case where the vehicle travels on a road having a plurality of lanes with autonomous driving assistance, and that executes autonomous driving assistance based on the created lane change route 33. The programs shown by flowcharts of FIGS. 8, 9, 13, 16, and 22 described below are stored in the RAM 42 or the ROM 43 of the navigation system 1 and are executed by the CPU 41.

In the autonomous driving assistance program, the CPU 41 first obtains in step (hereinafter abbreviated as S) 1 the control state of autonomous driving assistance by communicating with the vehicle control ECU 20 via the CAN, and determines if the vehicle is executing any autonomous driving assistance. Autonomous driving assistance is executed in the situations where the user selects to execute autonomous driving assistance by performing an operation of the various operation buttons 21 mounted on the vehicle, such as the autonomous driving start button, and it is determined that the vehicle can travel with autonomous driving assistance. In particular, in the present embodiment, one or more of the controls (1) to (6) are performed as autonomous driving assistance according to the condition of the vehicle and the shape of the road on which the vehicle is traveling.

If it is determined that the vehicle is executing autonomous driving assistance (S1: YES), the routine proceeds to S2. If it is determined that the vehicle is not executing autonomous driving assistance (S1: NO), the autonomous driving assistance program is terminated without creating the lane change route 33.

In S2, the CPU 41 performs lane change route creation processing (FIG. 9) described below. The lane change route creation processing is processing of creating the lane change route 33 (FIG. 7) defining a plan for how the vehicle is supposed to make lane changes when it travels on a road having a plurality of lanes. The navigation ECU 13 together with the vehicle control ECU 20 executes autonomous driving assistance so that the vehicle travels along the created lane change route 33. In the autonomous driving assistance of the present embodiment, lane changes cannot be made autonomously as described above, and therefore the user is prompted to make a lane change when it is time to change lanes in the lane change route 33. However, other embodiments may be configured so that lane changes are also made autonomously with autonomous driving assistance. Other embodiments may also be configured so that the lane change route 33 is not created in the case where the vehicle travels on a road having only one lane.

Figure 22:
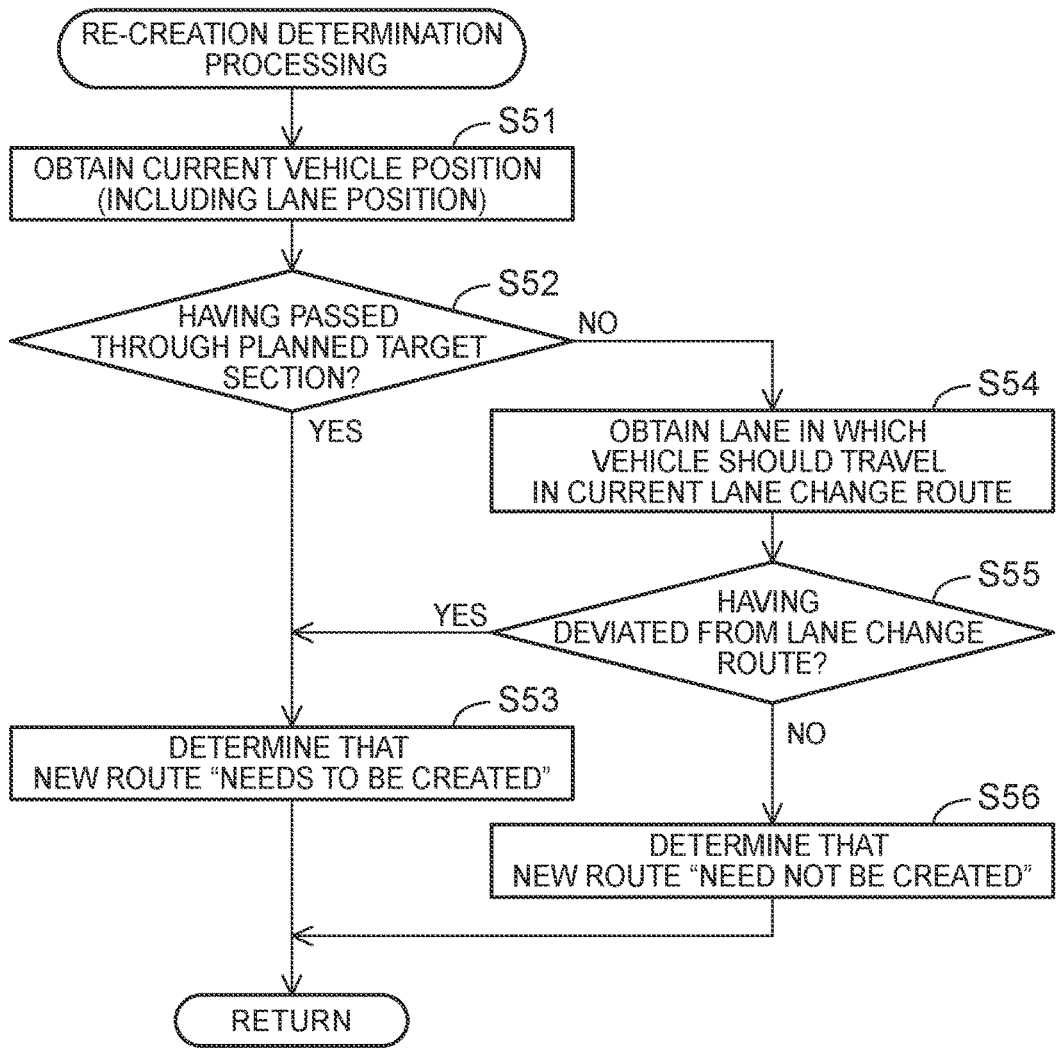
FIG. 22 is a flowchart of a sub-processing program of re-creation determination processing.

Thereafter, in S3, the CPU 41 performs re-creation determination processing (FIG. 22). The re-creation determination processing is processing of determining if a new lane change route 33 needs to be created. For example, a new lane change route 33 needs to be created in the case where the vehicle has passed through the end point of the current lane change route 33, or in the case where the current lane change route 33 needs to be corrected, e.g., because the vehicle has deviated from the lane change route 33.

Subsequently, in S4, the CPU 41 determines if it is determined in the re-creation determination processing of S3 that a new lane change route 33 needs to be created.

If it is determined in the re-creation determination processing of S3 that a new lane change route 33 needs to be created (S4: YES), the routine returns to S2 to create a new lane change route 33 based on the current condition of the vehicle, the shape of the road on which the vehicle travels, etc. If it is determined in the re-creation determination processing of S3 that a new lane change route 33 need not be created (S4: NO), the routine proceeds to S5.

In S5, the CPU 41 obtains the control state of autonomous driving assistance by communicating with the vehicle control ECU 20 via the CAN, and determines if the vehicle has terminated autonomous driving assistance. For example, autonomous driving assistance is terminated when the ACC power is turned off, when the user selects to terminate autonomous driving assistance by performing an operation of the various operation buttons 21 mounted on the vehicle, such as the autonomous driving start button, when an override such as a brake operation is detected, or when the vehicle enters a road section where autonomous driving assistance cannot be executed (e.g., a section where lane markings cannot be recognized).

If it is determined that the vehicle has terminated autonomous driving assistance (S5: YES), the autonomous driving assistance program is terminated. If it is determined that the vehicle is still executing autonomous driving assistance (S5: NO), the routine returns to S3.

Figure 9:
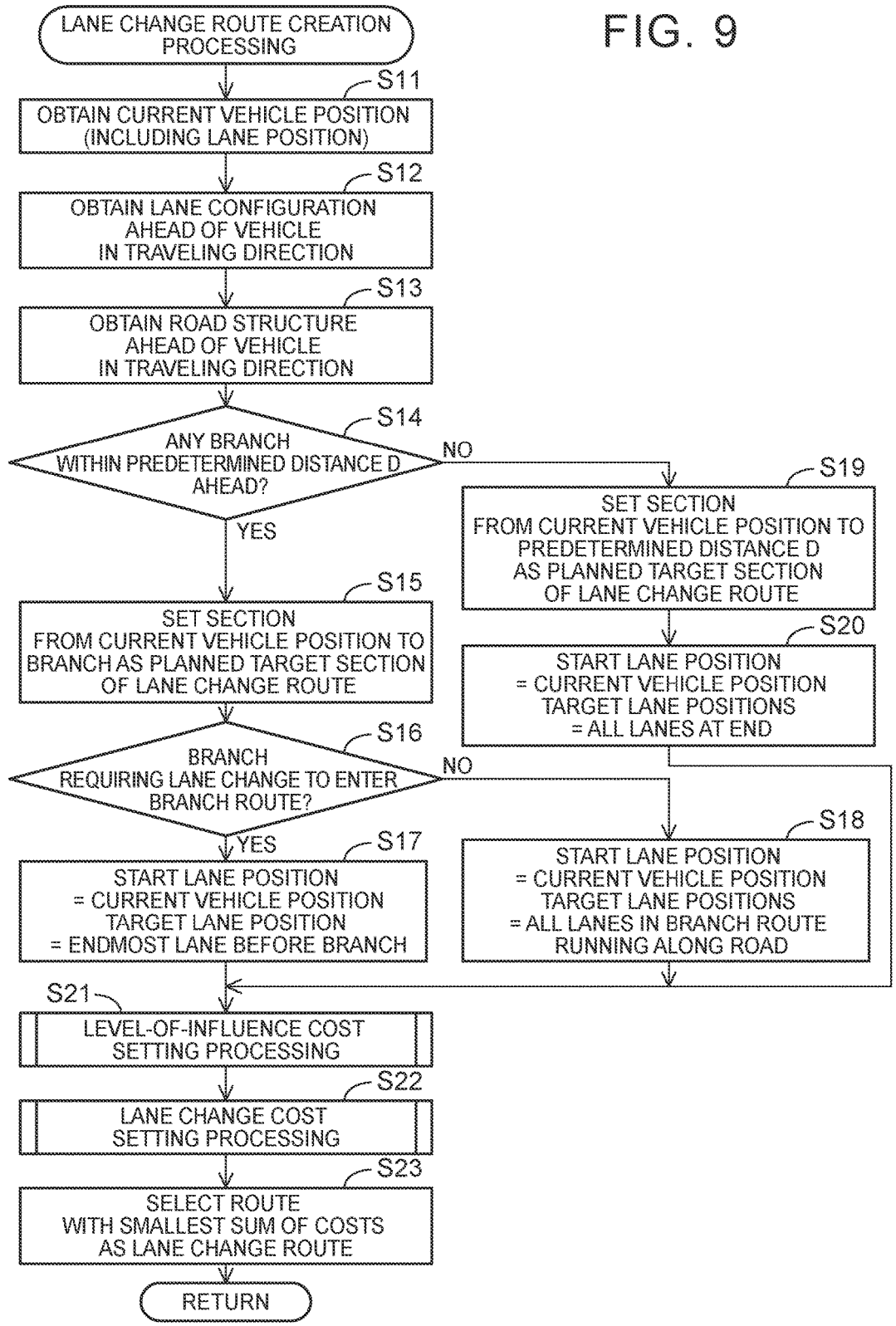
FIG. 9 is a flowchart of a sub-processing program of lane change route creation processing.

Sub-processing of the lane change route creation processing that is performed in S2 will be described based on FIG. 9. FIG. 9 is a flowchart of a sub-processing program of the lane change route creation processing.

First, in S11, the CPU 41 obtains the current position of the vehicle detected by the current position detection unit 11. It is desirable that the current position of the vehicle be specified in detail by using high accuracy location technology. The high accuracy location technology is technology that enables the lane in which a vehicle is traveling and the accurate position of the vehicle to be detected by detecting, by image recognition, white lines and road surface paint information obtained from a camera mounted on the vehicle and checking the white lines and the road surface paint information with a pre-stored map information DB. Since details of the high accuracy location technology are known in the art, description thereof will be omitted. In the case where the vehicle is traveling on a road having a plurality of lanes, the lane in which the vehicle is traveling is also specified.

Subsequently, in S12, the CPU 41 obtains from the map information DB 31 the lane configuration ahead of the vehicle in the direction in which the vehicle is traveling. The lane configuration obtained in S22 includes information specifying the number of lanes, lane increase, and lane reduction, etc.

In S13, the CPU 41 obtains from the map information DB 31 the road structure ahead of the vehicle in the direction in which the vehicle is traveling. The road structure obtained in S13 is information specifying whether there is any branch point or not and, if any, specifying the structure of the branch point. Specifically, the CPU 41 obtains from the map information DB 31 information specifying how a plurality of roads are connected at the branch point, and in the case where the road has a plurality of lanes, information specifying which lane connects to which branch route.

Subsequently, in S14, the CPU 41 determines based on the various information obtained in S11 to S13 if there is any branch point within a predetermined distance D (e.g., 1 km) from the current position of the vehicle.

If it is determined that there is a branch point within the predetermined distance D from the current position of the vehicle (S14: YES), the routine proceeds to S15. If it is determined that there is no branch point within the predetermined distance D from the current position of the vehicle (S14: NO), the routine proceeds to S19.

In S15, the CPU 41 sets the section from the current position of the vehicle to the branch point determined to be located ahead of the vehicle in the direction in which the vehicle is traveling in S14 as a section (planned target section) for which the lane change route 33 is to be created.

Subsequently, in S16, the CPU 41 determines based on the various information obtained in S12, S13 if the branch point determined to be located ahead of the vehicle in the direction in which the vehicle is traveling in S14 is a branch point that requires a lane change in order for the vehicle to enter a branch route other than a branch route running in the direction along the road. Specifically, a branch point at which a new lane is added and this lane branches from other lanes as shown in FIG. 10 is a branch point that requires a lane change in order for the vehicle to enter a branch route other than a branch route running in the direction along the road. On the other hand, a branch point at which the existing lane branches off from the other lanes as shown in FIG. 11 is a branch point that does not require a lane change in order for the vehicle to enter a branch route other than a branch route running in the direction along the road.

If it is determined that the branch point determined to be located ahead of the vehicle in the direction in which the vehicle is traveling in S14 is a branch point that requires a lane change in order for the vehicle to enter a branch route other than a branch route running in the direction along the road (S16: YES), the routine proceeds to S17. If it is determined that the branch point determined to be located ahead of the vehicle in the direction in which the vehicle is traveling in S14 is a branch point that does not require a lane change in order for the vehicle to enter a branch route other than a branch route running in the direction along the road (S16: NO), the routine proceeds to S18.

In S17, the CPU 41 sets a start lane position that is a position of a lane in which the vehicle travels at the beginning of the planned target section set in S15, and a target lane position that is a position of a target lane in which the vehicle is supposed to travel at the end of the planned target section. Specifically, as shown in FIG. 10, the position of the current lane of the vehicle at the start point of the planned target section is set as a start lane position 61. The position of the endmost lane (located closest to the branch route other than the branch route running in the direction along the road) before the branch point is set as a target lane position 62. Setting the target lane position 62 in this manner allows the vehicle to either travel along the road after reaching the target lane position 62 or change lanes to enter the branch route other than the branch route running in the direction along the road. The routine then proceeds to S21.

In S18, the CPU 41 sets a start lane position that is a position of a lane in which the vehicle travels at the beginning of the planned target section set in S15, and a target lane position that is a position of a target lane in which the vehicle is supposed to travel at the end of the planned target section. Specifically, as shown in FIG. 11, the position of the current lane of the vehicle at the start point of the planned target section is set as a start lane position 61. The positions of all the lanes in the branch route branching at the branch point in the direction along the road are set as target lane positions 62. Setting the target lane positions 62 in this manner allows the vehicle to travel in the direction along the road through the branch point located ahead of the vehicle in the direction in which the vehicle is traveling. When the vehicle enters the branch route other than the branch route running in the direction along the road, it is necessary to either cancel autonomous driving assistance or perform vehicle maneuvers to change lanes without following the lane change route 33. The routine then proceeds to S21.

In S19 that is performed when it is determined that there is no branch point within the predetermined distance D from the current position of the vehicle, the CPU 41 sets the section from the current position of the vehicle to the predetermined distance D as a planned target section.

Figure 12:
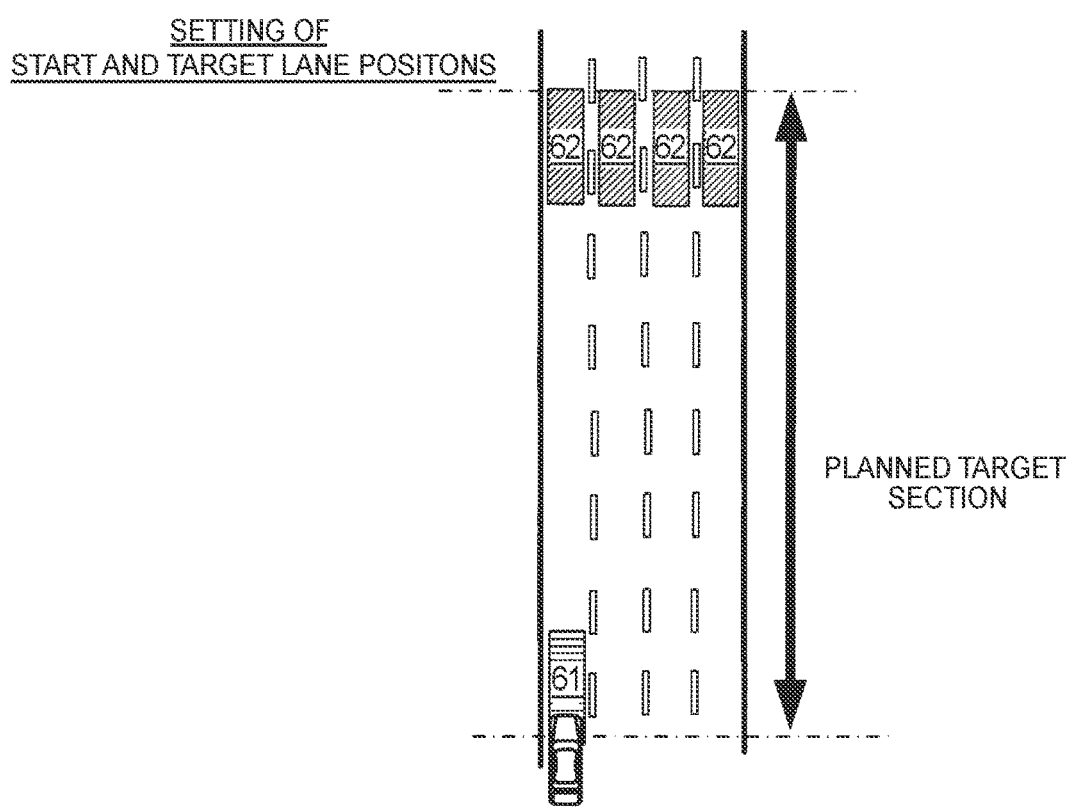
FIG. 12 is a diagram illustrating a method for setting a start lane position and a target lane position.

Subsequently, in S20, the CPU 41 sets a start lane position that is a position of a lane in which the vehicle travels at the beginning of the planned target section set in S19, and a target lane position that is a position of a target lane in which the vehicle is supposed to travel at the end of the planned target section. Specifically, as shown in FIG. 12, the position of the current lane of the vehicle at the start point of the planned target section is set as a start lane position 61. The positions of all the lanes at the end of the planned target section are set as target lane positions 62. The routine then proceeds to S21.

In S21, the CPU 41 performs level-of-influence cost setting processing (FIG. 13) described below. The level-of-influence cost setting processing is processing of setting cost according to the level of influence set for any obstructive factor included in the route. Specifically, a section where an obstructive factor occurs is specified for each lane, and cost according to the level of influence of the obstructive factor is set for the section. The higher the level of influence of the obstructive factor is, the higher the level-of-influence cost is.

Subsequently, in S22, the CPU 41 performs lane change cost setting processing (FIG. 16) described below. The lane change cost setting processing is processing of setting cost according to a lane change. Specifically, the planned target section is divided into a plurality of sections so that the start point and the end point of a section where an obstructive factor occurs form the boundaries between the sections. A possible route is specified for each lane, and for each specified route, lane change cost is set according to the number of lane changes. The lane change cost is set according to whether a lane change is to be made, the number of lane changes, and the distance within which a lane change needs to be performed.

Subsequently, in S23, the CPU 41 selects a lane change route 33 by using the level-of-influence cost set in S21 and the lane change cost set in S22. Specifically, the sum of the lane change cost and the level-of-influence cost is calculated for each route that can be taken from the start point to the end point. The start point and the end point are the start lane position 61 and the target lane positon(s) 62 set in S17, S18, S20. The route having the smallest sum is selected as the lane change route 33. For example, the cost calculation is performed by using Dijkstra's algorithm. S23 will be described in detail later.

Figure 13:
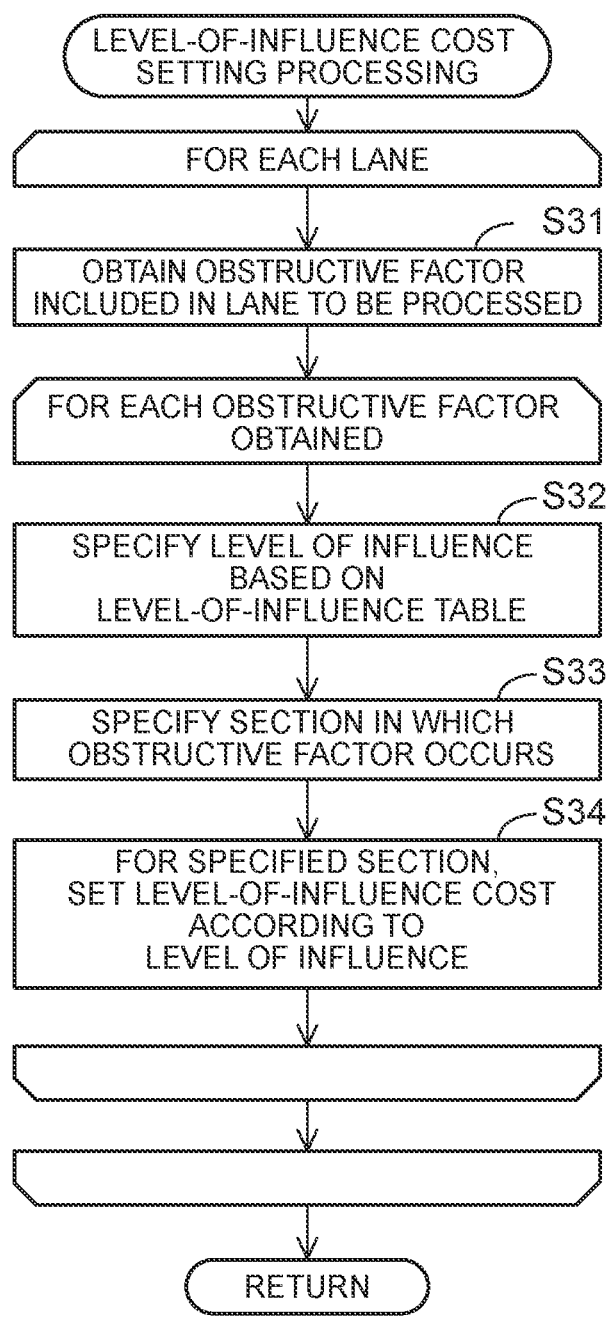
FIG. 13 is a flowchart of a sub-processing program of level-of-influence cost setting processing.

Sub-processing of the level-of-influence cost setting processing that is performed in S21 will be described based on FIG. 13. FIG. 13 is a flowchart of a sub-processing program of the level-of-influence cost setting processing.

S31 and the subsequent steps are performed for each lane in the planned target section set in S15 or S19.

First, in S31, the CPU 41 obtains, from map information stored in the map information DB 31 and communication with an external center, any obstructive factor included in the lane to be processed. The obstructive factor is a factor that obstructs continuation of autonomous driving assistance that is executed on the vehicle. In the present embodiment, the obstructive factor corresponds to any of the following seven situations.

(A) The lane in which the vehicle is traveling ends due to lane reduction.

(B) The vehicle is traveling particularly in a merging lane and the merging lane ends.

(C) A lane next to the lane in which the vehicle is traveling ends due to lane reduction.

(D) The vehicle is traveling particularly in a lane next to a merging lane (regardless of whether the merging lane ends or not).

(E) One lane marking of a lane is missing or has faded so much that the camera cannot recognize it.

(F) Both lane markings of a lane are missing or have faded so much that the camera cannot recognize them.

(G) A new lane is added next to a lane in which the vehicle is traveling due to lane increase.

Regarding (A) to (D) and (G), whether there is such a factor or not is determined based on the link data 34 stored in the map information DB 31. Regarding (E) and (F), whether there is such a factor or not is determined by obtaining, from an external server, information specifying the state of lane markings. The navigation system 1 may have the information specifying the state of lane markings.

S32 to S34 and the subsequent steps are performed for each obstructive factor obtained in S31.

First, in S32, the CPU 41 specifies, based on the level-of-influence table 32 (FIG. 2), the level of influence of the obstructive factor to be processed. For example, if the obstructive factor to be processed is "(C) a lane next to the lane in which the vehicle is traveling ends due to lane reduction," the level of influence is specified as "0.2." If the obstructive factor to be processed is "one lane marking of a lane is missing or has faded so much that the camera cannot recognize it" and the length of the section of this obstructive factor is 300 m, the level of influence is specified as "0.1×3=0.3."

In S33, the CPU 41 then specifies a section where the obstructive factor to be processed occurs in the lane to be processed. Specifically, regarding (A) and (B), a section from the point where the lane in which the vehicle is traveling starts to narrow to the point where this lane ends is specified as the section where the obstructive factor occurs. Regarding (C), a section from the point where the lane next to the lane in which the vehicle is traveling starts to narrow to the point where this lane ends is specified as the section where the obstructive factor occurs. Regarding (D), a section where the lane in which the vehicle is traveling is located next to a merging lane is specified as the section where the obstructive factor occurs. Regarding (E) and (F), a section where a lane marking(s) is missing or has faded so much that the camera cannot recognize it is specified as the section where the obstructive factor occurs. Regarding (G), a section from the point where a new lane appears next to the lane in which the vehicle is traveling to the point where the width of the new lane stops increasing is specified as the section where the obstructive factor occurs.

Subsequently, in S34, the CPU 41 sets, for the section specified in S33, the level-of-influence cost according to the level of influence specified in S32. In the present embodiment, "the level of influence=the level-of-influence cost."

Figure 14:
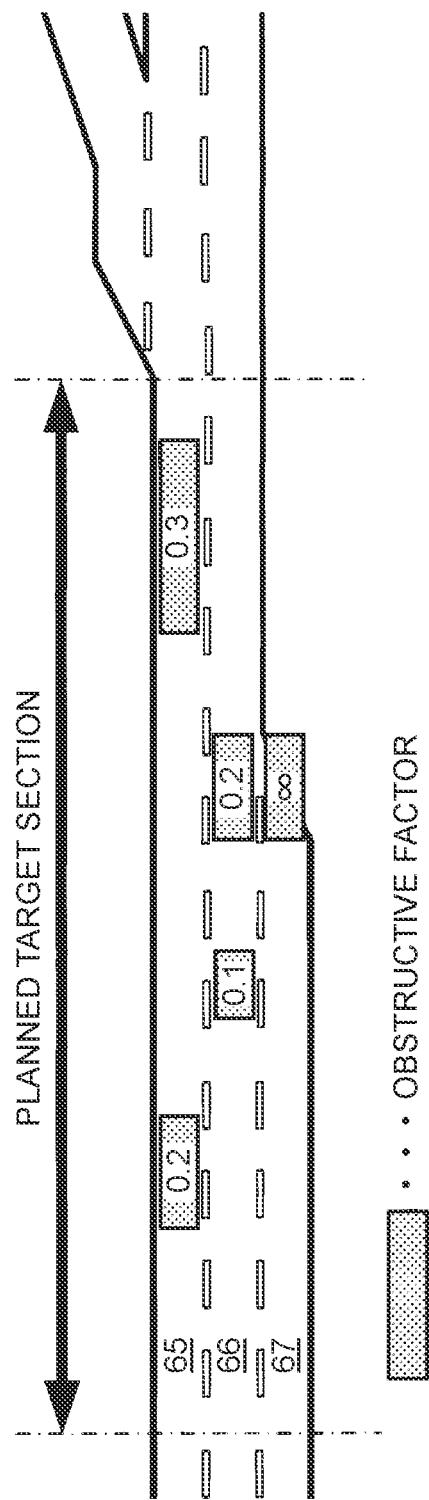
FIG. 14 is a diagram showing an example in which level-of-influence cost has been set for a planned target section.
Figure 15:
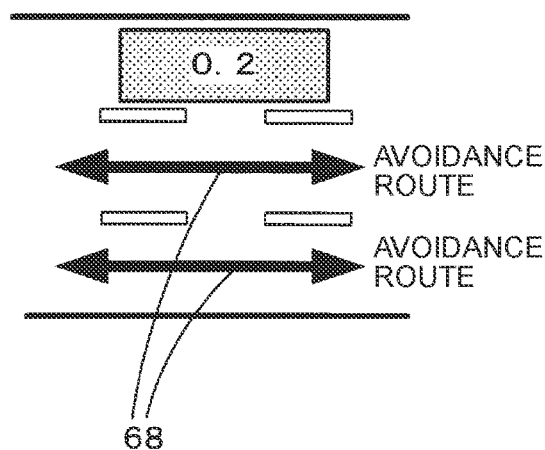
FIG. 15 is a diagram showing avoidance routes avoiding an obstructive factor.

S32 to S34 are performed for each lane and S31 to S34 are performed for each lane in the planned target section. Accordingly, as shown in FIG. 14, for each lane 65 to 67 in the planned target section, the level-of-influence cost is set for the section where the obstructive factor occurs. The longer the section for which the level-of-influence cost is set is, the longer the section where the obstructive factor occurs is. The higher the value of the level-of-influence cost set for the section is, the more autonomous driving assistance is likely to be cancelled in that section. As shown in FIG. 15, in a road section including a lane in which an obstructive factor occurs, each route 68 passing through a lane in which there is no obstructive factor and for which level-of-influence cost is not set is an avoidance route avoiding the obstructive factor. Since each route passing through the avoidance routes has a small sum of level-of-influence costs, a route preferentially passing through the avoidance routes is selected as a lane change route 33 when selecting a lane change route 33 in S23 described below. A route connecting all of avoidance routes set for each obstructive factor (that is, a route that does not pass through any section where an obstructive factor occurs) is more likely to be selected as a lane change route 33 because the sum of level-of-influence costs of this route is 0. However, since a lane change route 33 is selected also in view of lane change costs for lane changes in S23 described below, a route connecting a part of avoidance routes (that is, a route that passes through a section where an obstructive factor occurs) may be selected as a lane change route 33.

Figure 16:
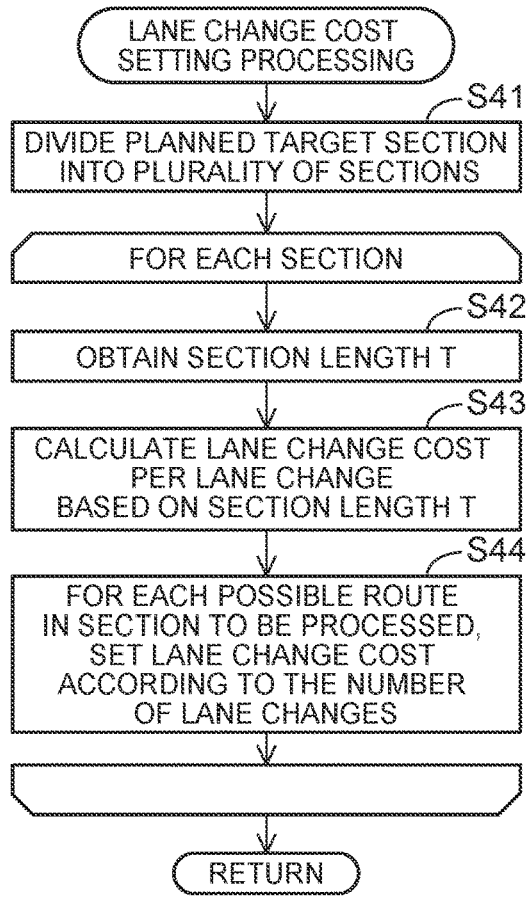
FIG. 16 is a flowchart of a sub-processing program of lane change cost setting processing.

Sub-processing of the lane change cost setting processing that is performed in S22 will be described based on FIG. 16. FIG. 16 is a flowchart of a sub-processing program of the lane change cost setting processing.

Figure 17:
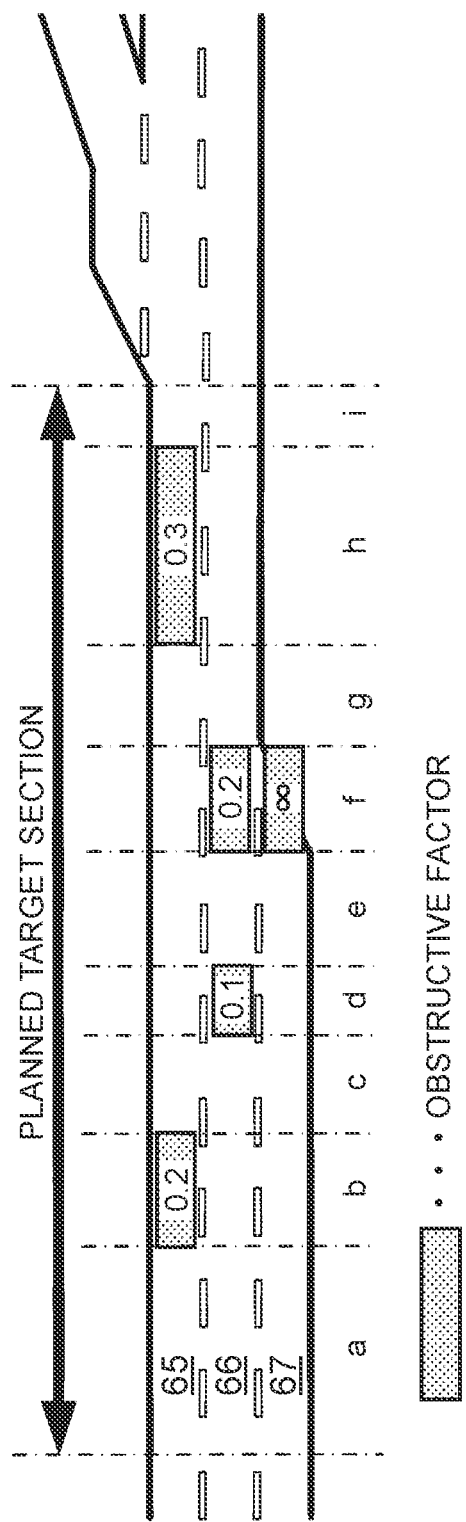
FIG. 17 is a diagram showing an example in which a planned target section has been divided into a plurality of sections.

First, in S41, the CPU 41 divides the planned target section set in S15 or S19 into a plurality of sections so that the start point and the end point of the section where the obstructive factor occurs, namely the section specified in the level-of-influence cost setting processing described above (FIG. 13), form the boundaries between the sections. For example, in the case where sections where the obstructive factor occurs are specified in the planned target section as shown in FIG. 17, the planned target section is divided into nine sections (a) to (i).

S42 and the subsequent steps are performed for each of the divided sections obtained in S41. First, S42 and the subsequent steps are performed for the section closest to the current position of the vehicle. S42 and the subsequent steps are then performed for the remaining sections in order from closest to the current position of the vehicle to farthest from the current position of the vehicle.

In S42, the CPU 41 obtains, from the map information stored in the map information DB 31 and communication with the external center, the length T of the section to be processed.

Subsequently, in S43, the CPU 41 calculates lane change cost per lane change in the section to be processed, based on the length T obtained in S42. Specifically, the lane change cost per lane change is calculated by the following Expression (1).

$$\text{Lane change cost} = \alpha/T \quad (1)$$

In Expression (1), α represents a constant (e.g., 0.1). However, α may be variable according to the road type, the volume of traffic, etc. For example, α may be set to a larger value for a section where the volume of traffic is larger and it is more difficult to change lanes. The shorter the section is, the more difficult it is to change lanes. Accordingly, the shorter the section is, the higher the lane change cost calculated by Expression (1) is.

Figure 18:
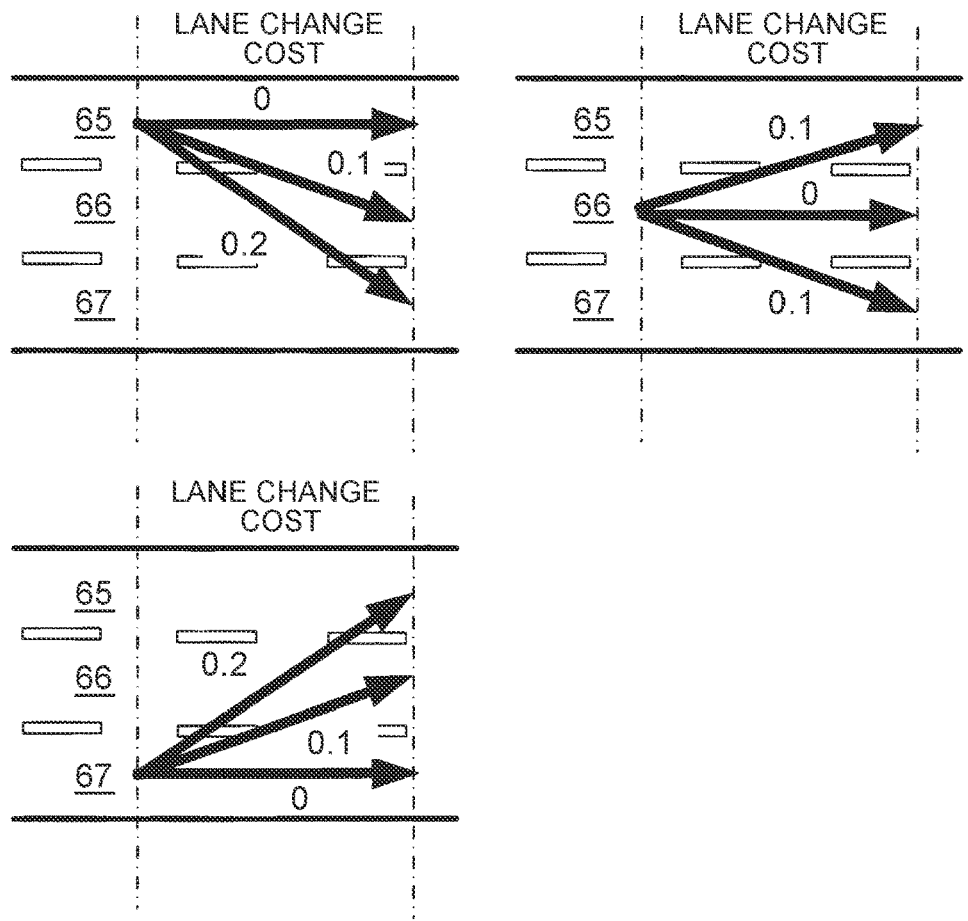
FIG. 18 is a diagram illustrating a method for setting lane change cost.

Subsequently, in S44, the CPU 41 specifies a possible route(s) in the section to be processed and sets, for each specified route, lane change cost according to the number of lane changes. A method for setting lane change cost in S44 will be described with respect to an example in which lane change cost is set for such a road section having three lanes as shown in FIG. 18 and lane change cost per lane change is "0.1."

First, the following three routes are possible for a left lane 65. A route going straight with no lane change; a route involving a lane change to a middle lane 66; and a route involving lane changes to a right lane 67. For the route going straight with no lane change, the number of lane changes is 0 and lane change cost is therefore set to "0." For the route involving a lane change to the middle lane 66, the number of lane changes is 1 and lane change cost is therefore set to "0.1." For the route involving lane changes to the right lane 67, the number of lane changes is 2 and lane change cost is therefore set to "0.1×2=0.2." Similarly, lane change cost according to the number of lane changes is set for each route that is possible for the middle lane 66 and for the right lane 67.

Figure 19:
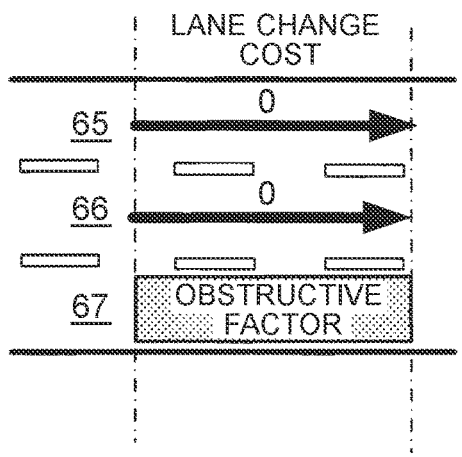
FIG. 19 is a diagram illustrating a method for setting lane change cost in the case where there is a section where an obstructive factor occurs.
Figure 20:
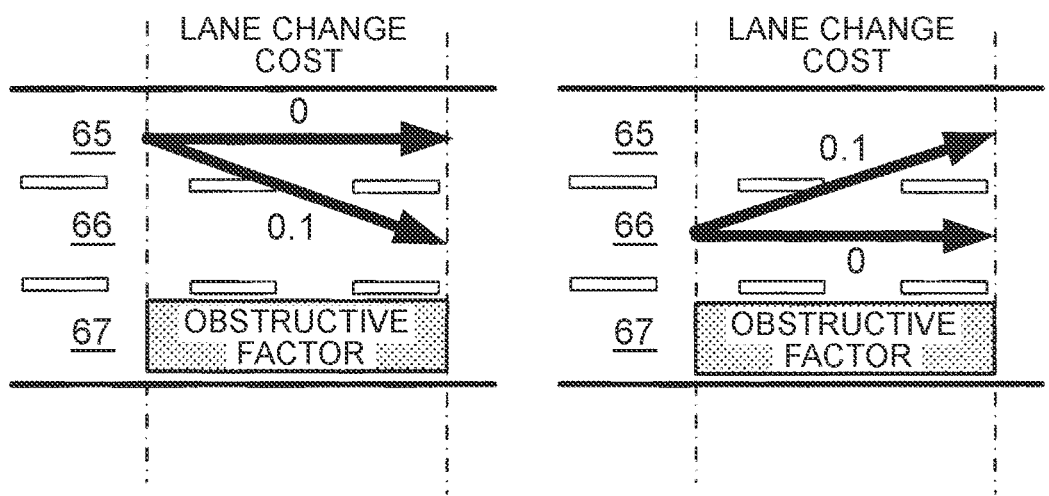
FIG. 20 is a diagram illustrating a method for setting lane change cost in the case where there is a section where an obstructive factor occurs.

It may be assumed that, if a section where an obstructive factor occurs is present in any of the lanes of the section to be processed, no lane change will be made in that section. In this case, as shown in FIG. 19, only routes going straight with no lane change may be specified and lane change cost may be set for each of the routes. As shown in FIG. 20, it may be assumed that no lane change will be made to a lane having a section where an obstructive factor occurs. In this case, as shown in FIG. 20, routes involving a lane change between the other lanes may be specified and lane change cost may be set for each of the routes.

Figure 21:
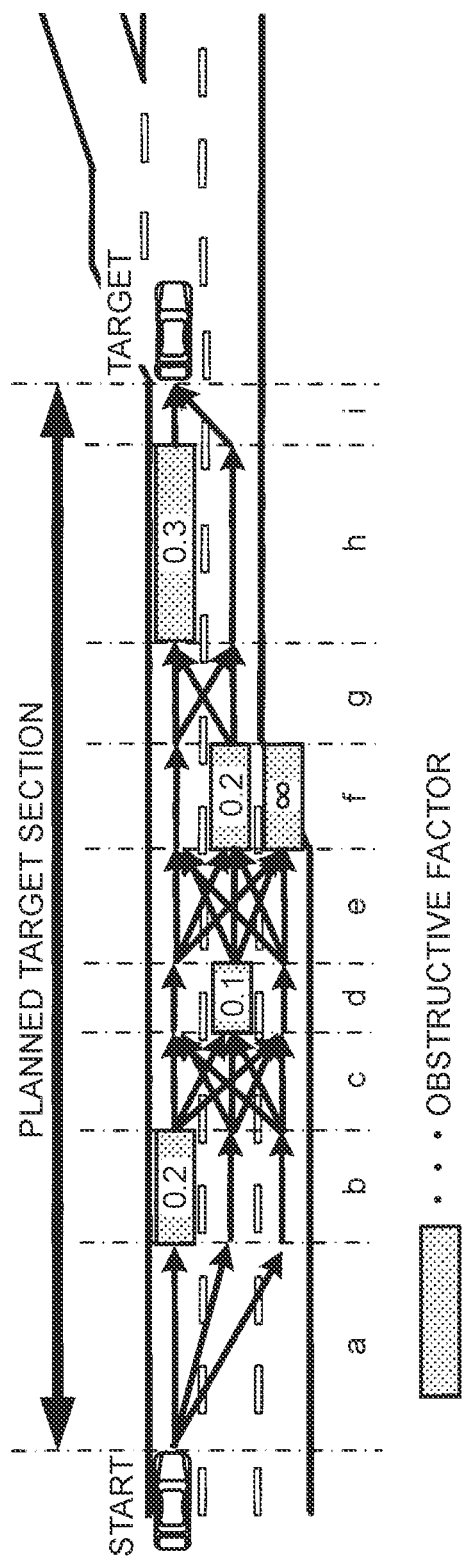
FIG. 21 is a diagram showing an example in which level-of-influence cost and lane change cost have been set for a planned target section.

S42 to S44 are performed for all of the divided sections, whereby lane change cost is set for each of the sections (a) to (i) of the planned target section, as shown in FIG. 21.

In the subsequent step S23, the CPU 41 calculates, for each route that can be taken from the start point to the end point, namely from the start lane position 61 to the target lane position 62 set in S17, S18, S20, the sum of the level-of-influence cost set in the level-of-influence cost setting processing (FIG. 13) and the lane change cost set in the lane change cost setting processing (FIG. 16). A route having the smallest sum is thus selected as a lane change route 33 (FIG. 7) by using, e.g., Dijkstra's algorithm. As a result, a route which is less affected by obstructive factors, in which autonomous driving assistance is less likely to be cancelled, and which reduces the burden of lane changes can be selected as a lane change route 33. A method other than Dijkstra's algorithm (e.g., a heuristic search method) may be used to search for an optimal route.

Subsequently, sub-processing of the re-creation determination processing that is performed in S3 will be described based on FIG. 22. FIG. 22 is a flowchart of a sub-processing program of the re-creation determination processing.

First, in S51, the CPU 41 obtains the current position of the vehicle detected by the current position detection unit 11. It is desirable that the current position of the vehicle be specified in detail by using high accuracy location technology. In the case where the vehicle is traveling on a road having a plurality of lanes, the lane in which the vehicle is traveling is also specified.

In S52, the CPU 41 then determines if the vehicle has passed through the end point of the planned target section set in S15 or S19 (that is, the end point of the current lane change route 33).

If it is determined that the vehicle has passed through the end point of the planned target section (S52: YES), it is necessary to create a lane change route 33 for a new section. It is therefore determined that a new lane change route 33 needs to be created (S53).

If it is determined that the vehicle has not passed through the end point of the planned target section (S52: NO), the routine proceeds to S54.

In S54, the CPU 41 specifies a lane in which the vehicle should travel at this point, based on the current lane change route 33. Specifically, the lane through which the lane change route 33 passes at the current position of the vehicle is the lane in which the vehicle should travel.

Subsequently, in S55, the CPU 41 compares the lane in which the vehicle is currently traveling as obtained in S51 with the lane in which the vehicle should travel as obtained in S54, and determines if the vehicle has deviated from the lane change route 33. Specifically, if the lane in which the vehicle is currently traveling as obtained in S51 is different from the lane in which the vehicle should travel as obtained in S54, it is determined that the vehicle has deviated from the lane change route 33.

If it is determined that the vehicle has deviated from the lane change route 33 (S55: YES), it is necessary to correct the lane change route 33 to a route according to the current position of the vehicle. It is therefore determined that a new lane change route 33 needs to be created (S53).

If it is determined that the vehicle has not deviated from the lane change route 33 (S55: NO), the current lane change route 33 can be used continuously. It is therefore determined that a new lane change route 33 need not be created (S53). The routine then proceeds to S4.

As described in detail above, in the navigation system 1 according to the present embodiment, the autonomous driving assistance method that is performed by the navigation system 1, and the computer program that is executed by the navigation system 1, an obstructive factor that is present on a road on which the vehicle is traveling and that obstructs continuation of autonomous driving assistance executed on the vehicle is obtained for each lane (S31), and for each of the obtained obstructive factors, an avoidance route is set so as to pass through a lane avoiding the obstructive factor, and a lane change route is created so as to preferentially pass through the avoidance routes set for each obstructive factor (S23). Autonomous driving assistance of the vehicle is thus executed based on the created lane change route. Regarding the obstructive factors that obstruct continuation of autonomous driving assistance, not only the closest obstructive factor but also a plurality of obstructive factors that are present on the road on which the vehicle is traveling are taken into account, whereby an optimal lane change route that avoids the obstructive factors in the entire route can be created. As a result, the number of lane changes is reduced, and autonomous driving assistance can be continuously performed without being cancelled.

It should be understood that the above embodiment need not be limiting and various improvements and modifications can be made without departing from the broad spirit and scope.

For example, in the embodiment, the user manually makes lane changes even when autonomous driving assistance is being executed. However, lane changes may be autonomously made with autonomous driving assistance. In that case, lane changes are autonomously made by performing steering control so that the vehicle travels along a created lane change route 33. Making right and left turns, stopping, starting, etc. may also be autonomously performed with autonomous driving assistance.

In the embodiment, a route having the smallest sum of the lane change cost according to any lane change and the level-of-influence cost according to the level of influence set for any obstructive factor included in the route is selected as a lane change route 33. However, a route having the smallest sum of only the level-of-influence costs may be selected as a lane change route 33.

In the embodiment, the lane change route 33 is created only when autonomous driving assistance is being executed. However, the lane change route 33 may be created when the vehicle is traveling by manual driving.

In the embodiment, the factors shown in FIG. 2 are described as the obstructive factors that obstruct continuation of autonomous driving assistance. However, the obstructive factors may be factors other than those shown in FIG. 2. For example, the obstructive factors may be a curve with a predetermined radius of curvature or more, a steep slope, etc.

In the embodiment, controlling all of an accelerator operation, a brake operation, and a steering wheel operation, which are maneuvers related to the vehicle behavior out of vehicle maneuvers, by the vehicle control ECU 20 is described as autonomous driving assistance that is executed so that the vehicle travels autonomously without user's driving maneuvers. In the autonomous driving assistance, however, the vehicle control ECU 20 may control at least one of the accelerator operation, the brake operation, and the steering wheel operation, which are the maneuvers related to the vehicle behavior out of the vehicle maneuvers. Manual driving based on user's driving maneuvers is described as the user performing all of the accelerator operation, the brake operation, and the steering wheel operation, which are the maneuvers related to the vehicle behavior out of the vehicle maneuvers.

In the embodiment, the navigation system 1 executes the autonomous driving assistance program (FIG. 8). However, the vehicle control ECU 20 may execute the autonomous driving assistance program. In that case, the vehicle control ECU 20 obtains the current position of the vehicle, map information, traffic information, etc. from the navigation system 1.

Embodiments may be based on devices having a route search function in addition to the navigation system 1. For example, embodiments may employ mobile phones, smartphones, tablet computers, personal computers, etc. (hereinafter referred to as the "mobile terminals etc."). Embodiments may employ systems formed by a server and a mobile terminal etc. In that case, each step of the above autonomous driving assistance program (FIG. 8) may be performed by either the server or the mobile terminal etc. In embodiments utilizing a mobile terminal etc., a vehicle capable of executing autonomous driving assistance and the mobile terminal etc. needs to be connected (either wired or wireless) so that they can communicate with each other.

Although the embodiment of the autonomous driving assistance system is described above, the autonomous driving assistance system may have the following configurations. In that case, the autonomous driving assistance system has the following effects.

For example, a first configuration is as follows.

An autonomous driving assistance system includes: lane information obtaining means for obtaining lane information of a road on which a vehicle is traveling; planned target section setting means for setting a planned target section for which a lane change plan of the vehicle is to be created; obstructive factor obtaining means for obtaining, for each lane, an obstructive factor that is present on the road on which the vehicle is traveling and that obstructs continuation of autonomous driving assistance executed on the vehicle; avoidance route setting means for setting, for each obstructive factor obtained by the obstructive factor obtaining means, an avoidance route that passes through a lane avoiding the obstructive factor; lane change route creating means for creating a lane change route that defines the lane change plan of the vehicle in the planned target section and that is set so as to preferentially pass through the avoidance route set for each obstructive factor obtained by the obstructive factor obtaining means; and autonomous driving assistance means for executing the autonomous driving assistance of the vehicle based on the lane change route.

According to the autonomous driving assistance system having the above configuration, regarding the obstructive factors that obstruct continuation of the autonomous driving assistance, not only the closest obstructive factor but also a plurality of obstructive factors that are present on the road on which the vehicle is traveling are taken into account, whereby an optimal lane change route that avoids the obstructive factors in the entire route can be created. As a result, the number of lane changes is reduced, and the autonomous driving assistance can be continuously performed without being cancelled.

A second configuration is as follows.

The lane change route creating means divides the planned target section into a plurality of sections so that a start point and an end point of a section where the obstructive factor occurs form boundaries between the sections, and creates the lane change route that is set so that, in the section where the obstructive factor occurs out of the plurality of sections, the lane change route preferentially passes through the avoidance route set for the obstructive factor.

According to the autonomous driving assistance system having the above configuration, an optimal lane change route that avoids the obstructive factors can be created.

A third configuration is as follows.

The autonomous driving assistance system further includes: level-of-influence setting means for setting, for each obstructive factor obtained by the obstructive factor obtaining means, a level of influence defining a degree to which the obstructive factor affects continuation of the autonomous driving assistance. The lane change route creating means creates the lane change route based on the level of influence set for the obstructive factor obtained by the obstructive factor obtaining means.

According to the autonomous driving assistance system having the above configuration, in the case where the obstructive factor that obstructs continuation of the autonomous driving assistance is present on the road on which the vehicle is traveling, the lane change route can be created by taking into account the degree to which the obstructive factor affects continuation of the autonomous driving assistance. As a result, a route in which the autonomous driving assistance is less likely to be cancelled can be specified as the lane change route.

A fourth configuration is as follows.

The obstructive factors include a first factor that obstructs continuation of the autonomous driving assistance as the vehicle can no longer continue to travel on the same lane, and a second factor that obstructs continuation of the autonomous driving assistance as another vehicle traveling in an adjacent lane needs to merge into a lane in which the vehicle is traveling. The level of influence of the first factor is set to a higher value than the level of influence of the second factor.

According to the autonomous driving assistance system having the above configuration, the degree to which each type of obstructive factor affects continuation of the autonomous driving assistance can be set accurately.

A fifth configuration is as follows.

The obstructive factors include a third factor that obstructs continuation of the autonomous driving assistance as road information required to execute the autonomous driving assistance on the vehicle cannot be obtained. The level of influence of the third factor is set so as to have a higher value as a distance over which the road information cannot be obtained increases.

According to the autonomous driving assistance system having the above configuration, the degree to which the obstructive factor affects continuation of the autonomous driving assistance can be set accurately according to the distance over which the road information cannot be obtained.

A sixth configuration is as follows.

The lane change route creating means preferentially creates, as the lane change route, a route having a smaller sum of the levels of influence set for the obstructive factors included in the route.

According to the autonomous driving assistance system having the above configuration, a route in which the autonomous driving assistance is least likely to be cancelled can be specified as the lane change route.

A seventh configuration is as follows.

The lane change route creating means calculates, for each of the plurality of sections, lane change cost according to a lane change and level-of-influence cost according to the level of influence set for the obstructive factor included in a route, and creates, as the lane change route, a route having a smallest sum of the lane change cost and the level-of-influence cost.

According to the autonomous driving assistance system having the above configuration, a route which is less affected by the obstructive factors, in which the autonomous driving assistance is less likely to be cancelled, and which reduces the burden of lane changes can be specified as the lane change route.

An eighth configuration is as follows.

The lane change route creating means calculates the lane change cost by defining whether a lane change is to be made or not for each of the plurality of sections excluding the section where the obstructive factor occurs.

According to the autonomous driving assistance system having the above configuration, since whether a lane change is to be made or not is taken into account for each section, the lane change route can be appropriately specified from a plurality of candidate routes in which the obstructive factors can be avoided by lane changes. It may be assumed that no lane change will be made in the section where the obstructive factor occurs. This can reduce the total number of routes for which cost calculation is performed and can reduce the burden of processing associated with creation of the lane change route.

A ninth configuration is as follows.

The lane change cost is calculated so as to have a higher value as the number of lane changes increases.

According to the autonomous driving assistance system having the above configuration, a route that involves a small number of lane changes and that reduces the burden of lane changes can be specified as the lane change route.

A tenth configuration is as follows.

The lane change cost is calculated so as to have a higher value as a length of the section requiring a lane change decreases.

According to the autonomous driving assistance system having the above configuration, a route that allows enough time to make lane changes and that reduces the burden of lane changes can be specified as the lane change route.

The invention claimed is:

1. An autonomous driving assistance system, comprising:
a processor programmed to:
obtain lane information of a road on which a vehicle is traveling;
set a planned target section for which a lane change plan of the vehicle is to be created;
obtain, for each lane, a plurality of obstructive factors that are present on the road on which the vehicle is traveling and that obstruct continuation of autonomous driving assistance executed on the vehicle;
set, for each obtained obstructive factor, an avoidance route that passes through a lane avoiding the obstructive factor;
set, for each obtained obstructive factor, a level of influence defining a degree to which the obstructive factor affects continuation of the autonomous driving assistance;
create a lane change route that defines the lane change plan of the vehicle in the planned target section based on the level of influence set for the obtained obstructive factor and that is set so as to preferentially pass through the avoidance route set for each obtained obstructive factor; and
execute the autonomous driving assistance of the vehicle based on the lane change route.

2. The autonomous driving assistance system according to claim 1, wherein the processor is programmed to:
divide the planned target section into a plurality of sections so that a start point and an end point of a section where one of the obstructive factors occurs form boundaries between the sections; and
create the lane change route that is set so that, in the section where the obstructive factor occurs out of the plurality of sections, the lane change route preferentially passes through the avoidance route set for the obstructive factor.

3. The autonomous driving assistance system according to claim 2, wherein the processor is programmed to:
calculate, for each of the plurality of sections, lane change cost according to a lane change and level-of-influence cost according to the level of influence set for the obstructive factor included in a route; and
create, as the lane change route, a route having a smallest sum of the lane change cost and the level-of-influence cost.

4. The autonomous driving assistance system according to claim 3, wherein the processor is programmed to:
calculate the lane change cost by defining whether a lane change is to be made or not for each of the plurality of sections excluding the section where the obstructive factor occurs.

5. The autonomous driving assistance system according to claim 3, wherein
the lane change cost is calculated so as to have a higher value as a number of lane changes increases.

6. The autonomous driving assistance system according to claim 3, wherein
the lane change cost is calculated so as to have a higher value as a length of the section requiring a lane change decreases.

7. The autonomous driving assistance system according to claim 1, wherein
the plurality of obstructive factors include a first factor that obstructs continuation of the autonomous driving assistance as the vehicle can no longer continue to travel on the same lane, and a second factor that obstructs continuation of the autonomous driving assistance as another vehicle traveling in an adjacent lane needs to merge into a lane in which the vehicle is traveling; and
the level of influence of the first factor is set to a higher value than the level of influence of the second factor.

8. The autonomous driving assistance system according to claim 7, wherein
the obstructive factors include a third factor that obstructs continuation of the autonomous driving assistance as road information required to execute the autonomous driving assistance on the vehicle cannot be obtained; and
the level of influence of the third factor is set so as to have a higher value as a distance over which the road information cannot be obtained increases.

9. The autonomous driving assistance system according to claim 1, wherein the processor is programmed to:
preferentially create, as the lane change route, a route having a smaller sum of the levels of influence set for the obstructive factors included in the route.

10. An autonomous driving assistance method, comprising:
obtaining lane information of a road on which a vehicle is traveling;
setting a planned target section for which a lane change plan of the vehicle is to be created;
obtaining, for each lane, a plurality of obstructive factors that are present on the road on which the vehicle is traveling and that obstruct continuation of autonomous driving assistance executed on the vehicle;
setting, for each obtained obstructive factor, an avoidance route that passes through a lane avoiding the obstructive factor;
setting, for each obtained obstructive factor, a level of influence defining a degree to which the obstructive factor affects continuation of the autonomous driving assistance;
creating a lane change route that defines the lane change plan of the vehicle in the planned target section based on the level of influence set for the obtained obstructive factor and that is set so as to preferentially pass through the avoidance route set for each obtained obstructive factor; and
executing the autonomous driving assistance of the vehicle based on the lane change route.

11. A computer-readable storage medium storing a computer-executable computer program that causes a computer to perform the following functions:
obtaining lane information of a road on which a vehicle is traveling;
setting a planned target section for which a lane change plan of the vehicle is to be created;
obtaining, for each lane, a plurality of obstructive factors that are present on the road on which the vehicle is traveling and that obstruct continuation of autonomous driving assistance executed on the vehicle;
setting, for each obtained obstructive factor, an avoidance route that passes through a lane avoiding the obstructive factor;
setting, for each obtained obstructive factor, a level of influence defining a degree to which the obstructive factor affects continuation of the autonomous driving assistance;
creating a lane change route that defines the lane change plan of the vehicle in the planned target section based on the level of influence set for the obtained obstructive factor and that is set so as to preferentially pass through the avoidance route set for each obtained obstructive factor; and executing the autonomous driving assistance of the vehicle based on the lane change route.

\* \* \* \* \*